United States Patent
Mital et al.

(10) Patent No.: US 10,055,396 B2
(45) Date of Patent: Aug. 21, 2018

(54) BINDING OF DATA SOURCE TO COMPOUND CONTROL

(71) Applicant: Microsoft Technology Licensing, LLC, Redmond, WA (US)

(72) Inventors: Vijay Mital, Kirkland, WA (US); Suraj T. Poozhiyil, Redmond, WA (US); Vikram Bapat, Seattle, WA (US); Benjamin Hodes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/862,281

(22) Filed: Apr. 12, 2013

(65) Prior Publication Data

US 2014/0310273 A1 Oct. 16, 2014

(51) Int. Cl.
*G06F 7/00* (2006.01)
*G06F 17/24* (2006.01)

(52) U.S. Cl.
CPC .................................. *G06F 17/246* (2013.01)

(58) Field of Classification Search
None
See application file for complete search history.

(56) References Cited

U.S. PATENT DOCUMENTS

| 6,418,400 | B1 | 7/2002 | Webber | |
|---|---|---|---|---|
| 7,516,145 | B2 | 4/2009 | Sikchi et al. | |
| 2003/0007009 | A1* | 1/2003 | Haley | G06F 9/4443 715/805 |
| 2005/0102303 | A1 | 5/2005 | Russell et al. | |
| 2006/0150085 | A1 | 7/2006 | Davis et al. | |
| 2006/0150172 | A1* | 7/2006 | Heath | G06F 8/20 717/162 |
| 2007/0156740 | A1* | 7/2007 | Leland | G06F 17/30395 |
| 2008/0114795 | A1 | 5/2008 | Agrawal et al. | |
| 2009/0327321 | A1 | 12/2009 | McCormack et al. | |
| 2011/0060704 | A1 | 3/2011 | Rubin et al. | |

(Continued)

FOREIGN PATENT DOCUMENTS

CN 102937970 A 2/2013
WO 2007032913 A1 3/2007

OTHER PUBLICATIONS

Kondotine, Link a Windows Forms Control to an Object: Data Binding, Oct. 10, 2010.*

(Continued)

*Primary Examiner* — Thu Nga Nguyen
(74) *Attorney, Agent, or Firm* — Workman Nydegger

(57) ABSTRACT

The automated binding of a data source to a compound control. The properties of the compound control are identified. Furthermore, a particular data source is associated with the compound control. For each of one or more of the properties of the compound control, information regarding the compound control and the data source are used to identify a set of one or more fields of the particular data source that may be bound to the corresponding property of the compound control. If the corresponding property of the compound control has bound thereto an output parameter of a declarative transformation, the nature of the transformation may also be taken into consideration when identifying the set of one or more fields that may be used in order to bind to the corresponding property of the compound control.

26 Claims, 18 Drawing Sheets

(56) References Cited

U.S. PATENT DOCUMENTS

2012/0123996 A1 5/2012 Krinsky
2013/0091164 A1 4/2013 Finnigan et al.

OTHER PUBLICATIONS

Dino Esposito, Cutting Edge, Feb. 2002.*
Rob Boucher, Improving Web Services Security: Scenarios and Implementation Guidance for WCF.*
Paul D. Sheriff, Data Binding with Windows Forms and ado.net, Nov. 2001.*
"International Search Report and Written Opinion Issued in PCT Application No. PCT/US2014/033709", dated Mar. 12, 2015, 17 Pages.
Pantazos, et al., "UVis Studio: An Integrated Development Environment for Visualization", In Proceedings of International Society for Optics and Photonics, vol. 8654, Feb. 4, 2013, 15 Pages.
"Second Written Opinion Issued in PCT Patent Application No. PCT/US2014/033709", dated Jul. 17, 2015, 6 Pages.
"International Preliminary Report on Patentability Issued in PCT Application No. PCT/US2014/033709", dated Oct. 16, 2015, 7 Pages.
"Office Action and Search Report Issued in Chinese Patent Application No. 201480020887.9", dated Apr. 24, 2017, 19 Pages.
Notice of Allowance issued in European Patent Application No. 14723647.5 dated May 31, 2017.
"Using Simple and Complex Data Binding in an Application", Published on: Jan. 7, 2012, Available at: http://www.icodeguru.com/dotnet/core.c.sharp.and.dot.net/0131472275/ch12lev1sec2.html.
"Data Binding and Windows Forms", Published on: Oct. 3, 2008, Available at: http://msdn.microsoft.com/en-us/library/c8aebh9k.aspx.
"Link a Windows Forms Control to an Object: Data Binding", Published on: Feb. 14, 2011, Available at: http://www.tinesoft.com/csharp/link-a-windows-forms-control-to-an-object-data-binding.
Ericson, Gary, "StreamInsight for Non-Programmers", Published on: Nov. 13, 2012, Available at: http://social.technet.microsoft.com/wiki/contents/articles/14437.streaminsight-for-non-programmers.aspx.
"Second Office Action Issued in Chinese Patent Application No. 201480020887.9", dated Dec. 14, 2017, 22 Pages.

* cited by examiner

BINDING OF DATA SOURCE TO COMPOUND CONTROL

BACKGROUND

A "recalculation document" is an electronic document that shows various data sources and data sinks, and allows for a declarative transformation between a data source and a data sink. For any given set of transformations interconnecting various data sources and data sinks, the output of the data source may be consumed by the data sink, or the output of the data source may be subject to transformations prior to being consumed by the data sink. These various transformations are evaluated resulting in one or more outputs represented throughout the recalculation document.

The user can add and edit the declarative transformations without having in-depth knowledge of coding. Such editing automatically causes the transformations to be recalculated, causing a change in one of more outputs.

A specific example of a recalculation document is a spreadsheet document, which includes a grid of cells. Any given cell might include an expression that is evaluated to output a particular value that is displayed in the cell. The expression might refer to a data source, such as one or more other cells or values.

BRIEF SUMMARY

At least some embodiments described herein relate to the automated binding of a data source to a compound control. The properties of the compound control are identified. Furthermore, a particular data source is associated with the compound control. For each of one or more of the properties of the compound control, information regarding the compound control and the data source are used to identify a set of one or more fields of the particular data source that may be bound to the corresponding property of the compound control. If the corresponding property of the compound control has bound thereto an output parameter of a declarative transformation, the nature of the transformation may also be taken into consideration when identifying the set of one or more fields that may be used in order to bind to the corresponding property of the compound control.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate the facilitating of automated binding of a data source to a compound control. The properties of the compound control are identified. Furthermore, a particular data source is associated with the compound control. For instance, the particular data source may have been selected by a user out of multiple available data sources to use to bind to the compound control. The available data sources may have been automatically identified by evaluating information regarding the compound control (such as the hierarchy, constituent properties, and so forth) and information regarding the data source (such as the schema) to determine which data sources are the most suitable matches for binding to the compound control.

For each of one or more of the properties of the compound control, information regarding the compound control and the selected data source are used to identify a set of one or more fields of the particular data source that may be bound to the corresponding property of the compound control. If the corresponding property of the compound control has bound thereto an output parameter of a declarative transformation, the nature of the transformation may also be taken into consideration when identifying the set of one or more fields that may be used in order to bind to the corresponding property of the compound control.

The automated binding process and the use of declarative transformations means that even non-programmers may create bindings between complex data and controls. This allows complex controls to be reasonably used in the context of recalculation user interface, such as recalculation documents, in which transformations between data sources, data sinks, and controls may be declaratively defined, without using imperative programming.

Some introductory discussion of a computing system will be described with respect to FIG. 1. Then, the process of binding of complex data and controls will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
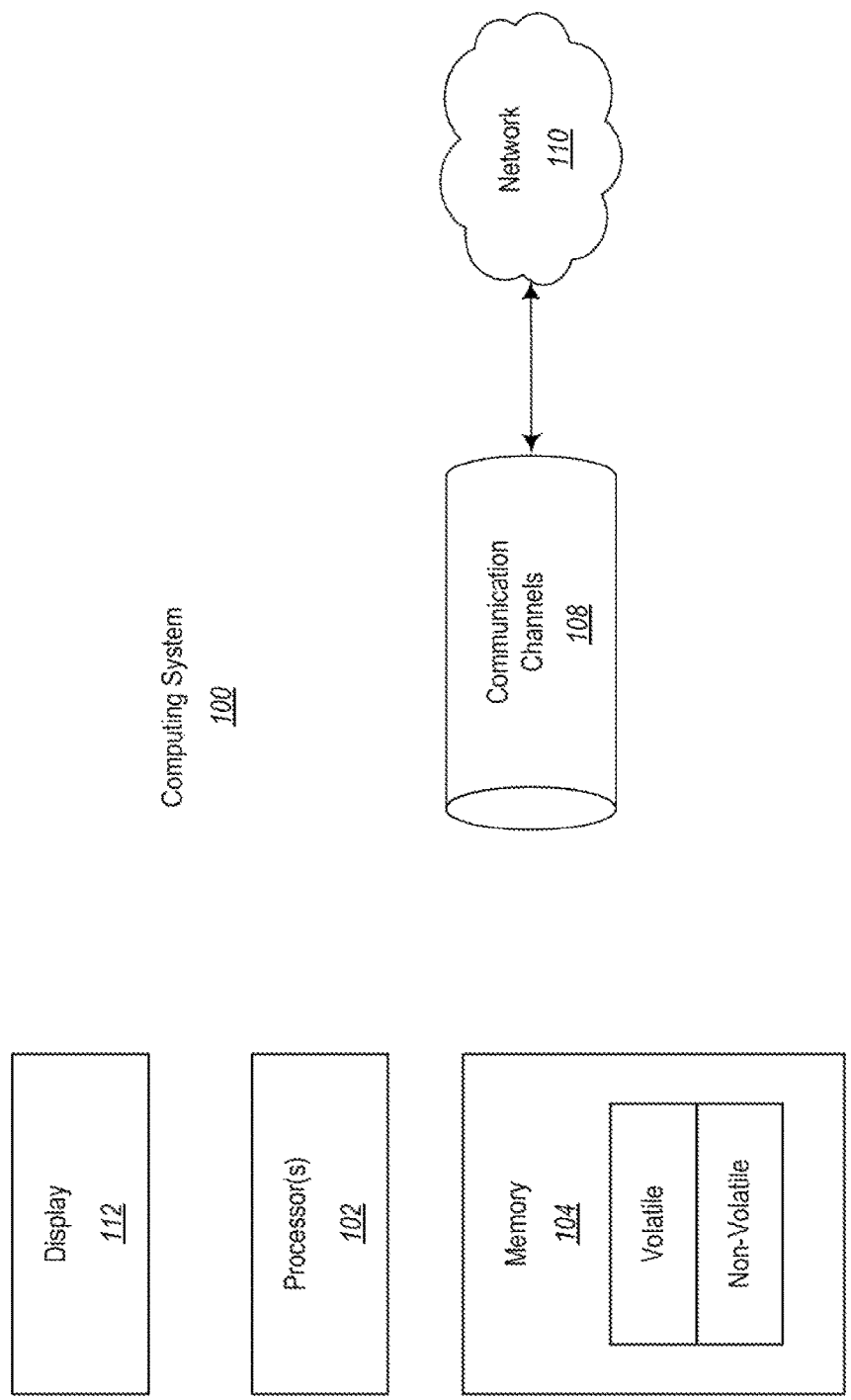
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
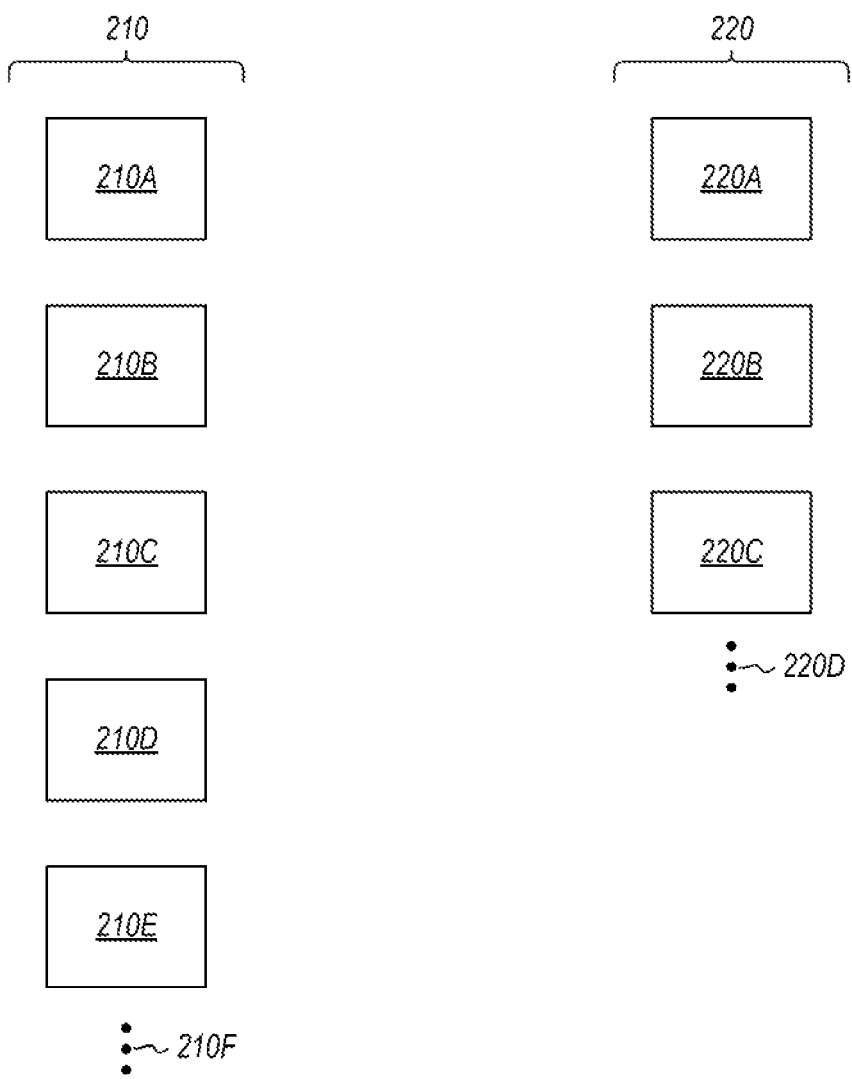
FIG. 2 illustrates an environment that includes multiple data sources and multiple controls.

FIG. 2 illustrates an environment 200 that includes multiple data sources 210 and multiple controls 220. For instance, the data sources 210 are illustrated as including five data sources 210A through 210E. However, the ellipses 210F represent that there may be any number of data sources within the data sources 210, from as few as one, to as many as countless, as the principles described herein are not limited to the number of data sources available in the environment 200.

Each data source includes one or more fields organized into a particular schema that describes positional relationships between the fields and also a type of each field. A schema may be shared between two or more data sources, although a data source may have a unique schema. As data becomes more readily abundant and storage capability more advanced, data sources can be quite complex, involving innumerable fields.

The controls 220 are illustrated as including three controls 220A, 220B and 220C. However, again, the ellipses 220D represent that there may be any number of data sources within the data sources 210, from as few as one, to as many as countless, as the principles described herein are not limited to the number of controls available in the environment 200.

The controls 220 are each computer-executable code that have a concept of layout that they operate upon. For instance, in visualization controls, a corresponding visualization is often displayed within a user interface displayed on a display, such as the display 112 of FIG. 1. In compound controls, a control may be included within a parent control and/or associated with peer controls, to form enumerable varieties of hierarchical structures of controls. Furthermore, a control may be a "repeating composition" in the sense that the hierarchical structure is repeated to represent a data series. For instance, a chart of multiple bars may be a control of repeating composition, one for each bar. Thus, each bar is formed from a data group of the data series. As another example, a gallery of multiple items may be a control of repeating composition, one for each item. Each item might itself be a hierarchical structure. For instance, the structure might include an image and a two label controls, one for description and one for price.

The functionality of controls is affected by its properties. Accordingly, by binding data to the properties of the control, intended functionality of the control may be obtained. However, data sources may have complex schemas of enumerable fields. Furthermore, controls may also have complex structures and many properties. A programmer that has familiarity with the schema of available data sources and the structure of the complex control may use their knowledge to bind data from a data source to a particular property of a complex control. Thus, the programmer may already be aware of the control properties that are available for binding.

On the other hand, a non-programmer is likely not to have an idea of which data is available for binding to control properties. They are also likely not familiar with the language of binding commands, and the naming convention for control properties. The principles described herein make it much easier for a non-programmer to be able to identify the available control properties that data can be bound to. The principles also make it easier for a non-programmer to find appropriate data for binding to the properties. Thus, the principles described herein allow more intuitive binding of complex data to complex controls, opening up new opportunities for non-programmers to delve into the process of creating complex controls. Complex controls may even be incorporated into recalculation user interfaces (described in further detail below) such as word documents, spreadsheet programs, and so forth. For instance, the controls 220 might be included within a recalculation user interface.

Figure 3:
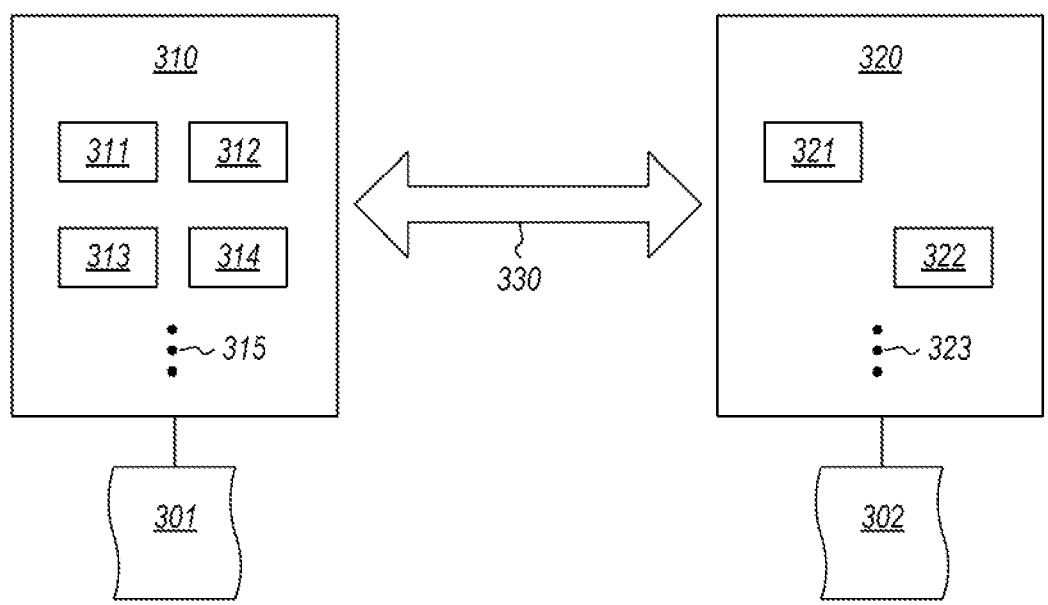
FIG. 3 illustrates an environment in further detail including a single data source and a single control, and an association between the two.

FIG. 3 illustrates an environment 300 in further detail including a single data source 310 and a single control 320. For instance, the data source 310 might be any of the data sources 210 of FIG. 2, and the control 320 might be any of the controls 220 of FIG. 2. The data source 310 is associated with the control 320 as represented by the arrow 330.

The binding that occurs between the data source 310 and the control 320 are between the fields of the data source 310 and the properties of the control 320. As illustrated in FIG. 3, the data source 310 includes four fields 311 through 314. However, the ellipses 315 represent that the principles described herein may operate to bind data from a data source may have any number of fields consistent with its schema from as few as one to enumerable. As illustrated, the control 320 includes two properties 321 and 322. However, again, the ellipses 323 represent that the principles described herein may operate to bind data to properties of a control, regardless of how many properties are in the control. In fact, the principles described herein allow a non-programmer to more intuitively bind data from a data source to properties of a control regardless of how complex and expansive the data source and the control.

In this description, two types of binding will be discussed. One type of binding is called a "direct binding". A direct binding provides a copy of the data without modification from the corresponding field of the data source to the corresponding property of the control. Another type of binding will be referred to herein as a "transformation" binding. In transformation binding, the corresponding control property is bound to an output parameter of an associated transformation having one or more input parameters and one or more output parameters. The field is bound to an input parameter of the one or more input parameters of the transformation. The transformation performs a calculation or other type of transform on the data within the input parameters to generate output parameters, which affect the functionality of the control. A direct binding may be viewed as a trivial form of a transformation binding in which the transformation simply functions to provide the data at its sole input parameter to its sole output parameter.

Figure 4:
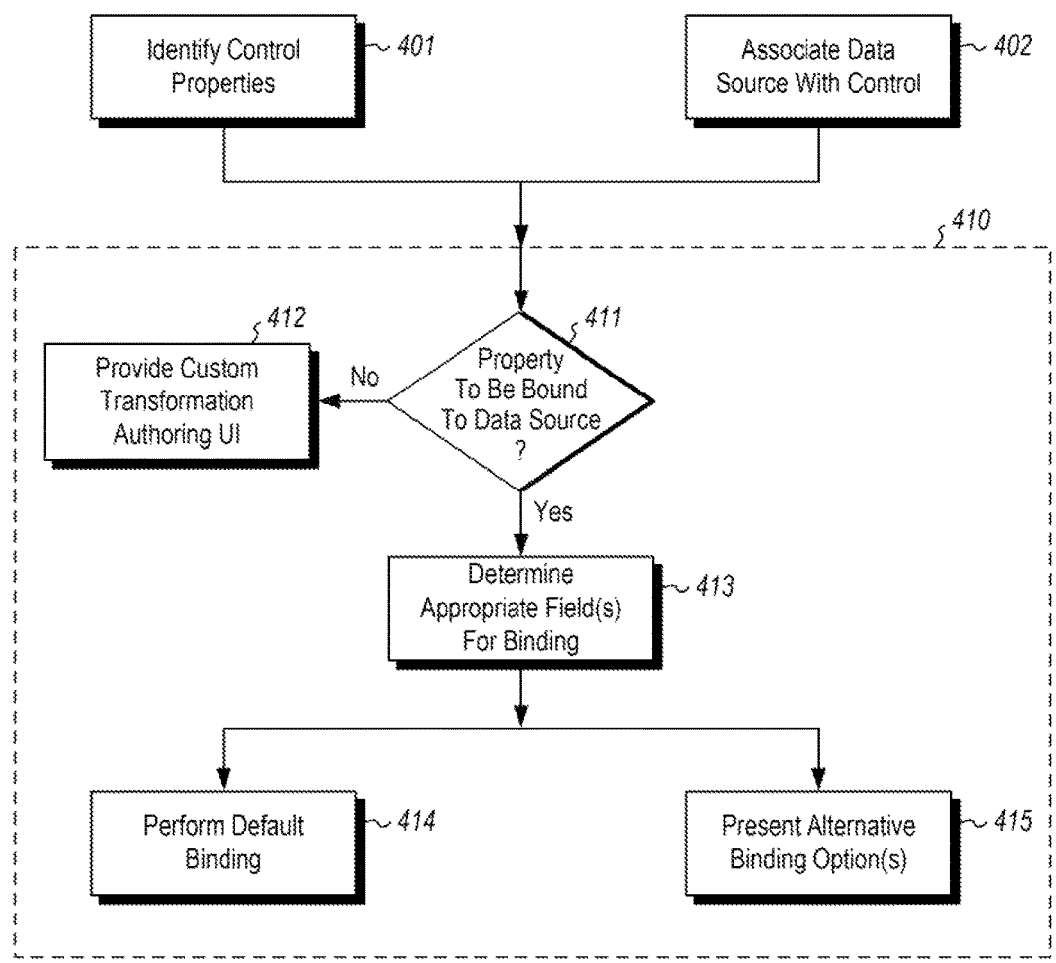
FIG. 4 illustrates a flowchart of a method for binding a data source to a data control.

FIG. 4 illustrates a flowchart of a method 400 for binding a data source to a data control. As with any process or method described herein, the method 400 may be performed by a computing system in response to one or more processors of the computing system executing computer-executable instructions structured to cause the computing system to perform the method. Such instructions may, for example, be embodied on one or more computer-readable media.

The method 400 involves the computing system identifying properties of the compound control (act 401). Referring to FIG. 3, there is information 302 associated with the control 320. The information 302 includes the name and type of the various properties of the control 320. The information 302 also includes information representing the hierarchy of the control 320. This information 302 may be used by the computing system to navigate through the control 320 and find the name and types of all of the properties so that the names can be presented to the user. The information 302 might also include any other information helpful in identifying what data might more suitably be bound to the properties of the control.

In hierarchically structured controls, the computing system might use the information 302 to navigate throughout the hierarchical control to find the properties of the control. The names of the associated properties may then be presented to the user as a list, rather than present the properties to the user in a complicated hierarchy, Thus, the user need not be familiar with the hierarchical structure of the control, but may just simply see the list of properties to which binding may occur.

In addition, a particular data source is associated with the compound control (act 402). Referring to FIG. 3, the association between the data source 310 and the control 320 is abstractly represented by the arrow 330. Thus, the data source 310 will be bound to the control 320 by binding one or more of the fields of the data source 310 (either through direct binding or transformation binding) to one or more properties of the control 320.

The particular data source might have been selected from multiple data sources as a suitable source of binding to the control. For instance, in FIG. 2, there are multiple data sources 220 within the environment 200. The computing system may then use metadata (e.g., information 302) associated with the properties of the control 320 and information 301 regarding the data source 310 to heuristically identify that the data source is a suitable source of data bindings for the control. Such heuristics might take into account the type of the available fields, any knowledge the computing system has been able to obtain regarding the meaning of the fields, previous usage associated with a larger population of users, previously usage associated with this particular user, and any other useful information.

Figure 5:
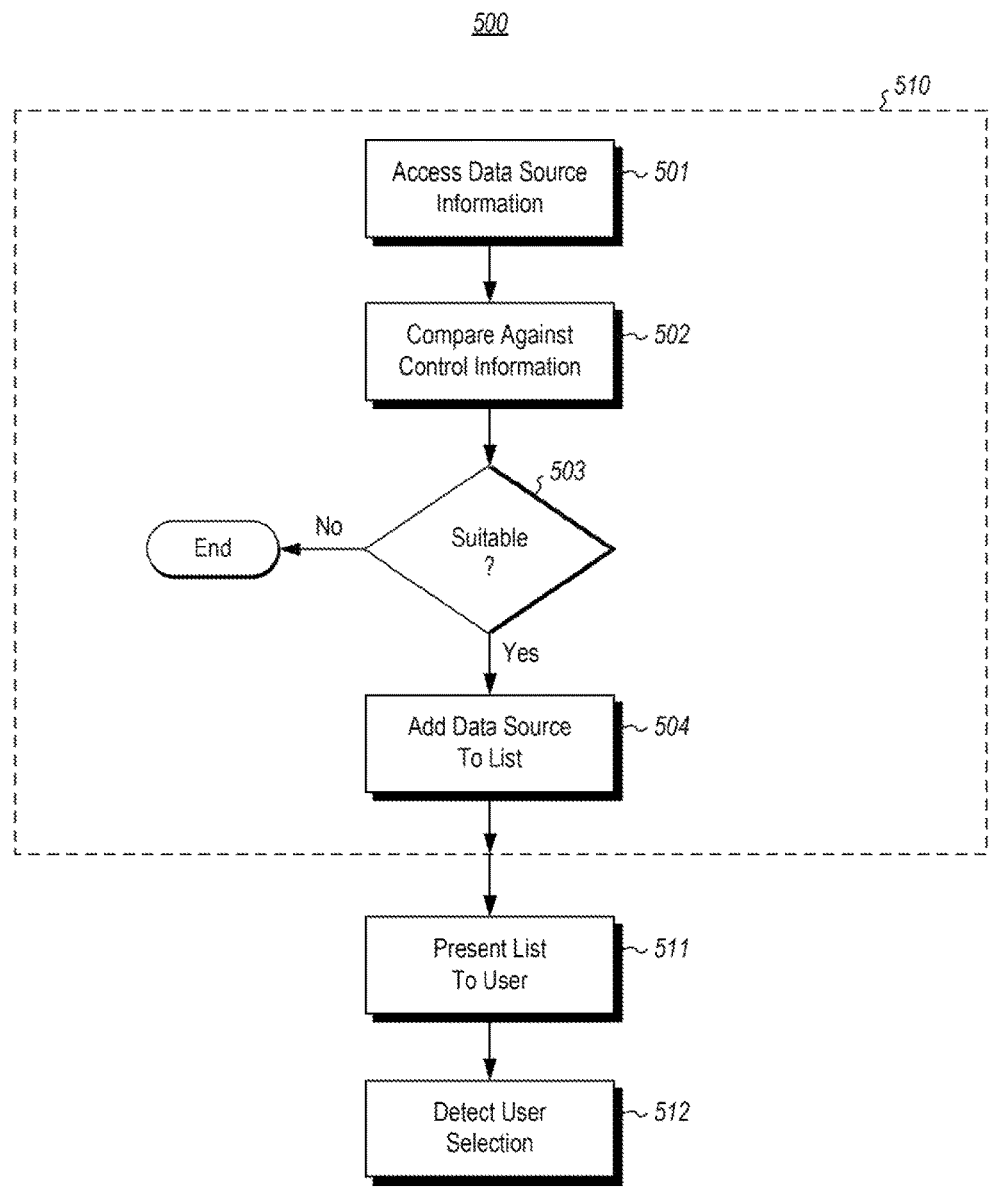
FIG. 5 illustrates a flowchart of a method for associating the particular data source with a control, such as a compound control.

FIG. 5 illustrates a flowchart of a method 500 for associating the particular data source with a control, such as a compound control. The method 500 represents an example of the act 402 of FIG. 4, and thus will be described here. After the description of FIG. 5, the description will return to that of FIG. 4.

All of the acts 501 through 505 within the box 510 are performed for each of multiple data sources. For instance, in the context of FIG. 2, the content of box 510 may be performed for each of the data sources 210. The method 500 involves accessing the data source information (act 501). For instance, if acting upon the data source 310 of FIG. 3, the computing system would access the information 301 associated with the data source 310. This data source information 301 might include any information helpful to determine a suitability of the data source for binding to the control and/or any information helpful to make a determination of which fields of the data source might be used to bind to a particular property of the control. That data source information 301 might include the name, type and perhaps meaning of each of the data type fields, and the schema of the data source.

The computing system then compares the data source information (e.g., information 301) against the control information (e.g., information 302) (act 502) to determine whether the corresponding data source may be used as a source of data to bind to the compound control (decision block 503). If the data source can be used as a source of data to bind to the compound control ("Yes" in decision block 503), the identity of the data source is added to a list of available data sources (act 504).

The performance of all of the acts within box 510 may result in more than one available data source in the list. If so, the computing system presents a list of the available data sources to the user for selection (act 511). The computing system then receives the user selection of the particular data source (e.g., data source 310) (act 512).

Returning to FIG. 4, the remaining portions of the method 400 (the contents of box 410) are performed for each of the properties of the control. For the corresponding property, the computing system determines whether the property is to be bound to the data source (decision block 411). For instance, perhaps there are not any fields within the data source that are suitable for binding to the property. In that case, the computing system may provide a transformation authoring interface that is specific to the type of the property (act 412).

For instance, perhaps there is a label control that includes a "color" property. The data source might have quite a lot of data that can be bound to the control, but not a color. Accordingly, the user might be presented with a color picker that allows the user to select a color for the label, or provide a declarative transformation that provides the color as an output parameter for binding to the corresponding property.

If the property is to be bound to the selected data source ("Yes" in decision block 411), the data source information (e.g., the data source schema) and the control information (e.g., metadata regarding the property) are used to identify a set of one or more fields of the particular data source that may be bound to the corresponding property of the compound control (act 413). Again, the computing system may use any available information in order to make this identification. For instance, any prior binding statistics associated with similar data sources and similar properties describing how fields had been selected for binding by multiple users (or by this particular user) may be evaluated. Thus, the computing system may learn over time what fields are best matches for what properties. The computing system might also take into consideration hints that are provided to the computing system by the user.

In some cases, each binding may begin with a direct binding, but give the user an opportunity to provide a transformation to the binding. For instance, the transformation might be a declarative transformation, allowing the transformations to be provided by a non-programmer since imperative language coding knowledge is not needed to effectuate the transformation. When a declarative transformation is provided, the act 413 may be performed also considering the characteristics of the transformation. For instance, the type, name and meaning of the one or more input parameters of the transformation may be considered, along with the type, name and meaning of the one or more output parameters of the transformation. This input parameter types may be matched against the field types of the data source for proper binding of the data source field to the input parameter of the transformation. Likewise, the output types may be matched against the control property types for property binding of the transformation output parameters to the control property.

The computing system then may perform a default binding of one of the fields of the data source to the corresponding property (act 414). Also, the computing system may display a list of one or more alternative fields that may be bound to the corresponding property (act 415). The default binding may have been what the computing system determined as the best possibility for binding to the corresponding property given the decision heuristics. The one or more alternative bindings may be runners up given the decision heuristics. If there were no runners up, then perhaps no alternative binding options are suggested. The alternative bindings might also suggest different transformation bindings that will allow proper binding.

In this state, there are a number of events that could cause further binding activity. One event is for the computing system to receive user input indicating a desired to change the binding. For instance, perhaps one or more of the alternative bindings were deemed by the user to be more suitable. In that case, the selected alternative binding is performed by binding another field of the data source to the corresponding property.

Another event might be the adding or editing of a transformation for the corresponding property. If such an event is detected, that could very well change which field should be bound via the transformation to the control property. Accordingly, if that event occurs, the method 400 is repeated for that property beginning at decision block 411.

Another category of events might occur in an incremental authoring environment in which the compound control itself is still under construction. For instance, if a property is added to a control, the content of box 410 may be repeated for that new property. If a new control is added to the compound control, then the various one or more properties of the control are identified (act 401 within the scope of the added control), and the contents of box 410 are performed for each of the newly discovered properties of the added control.

Figure 6:
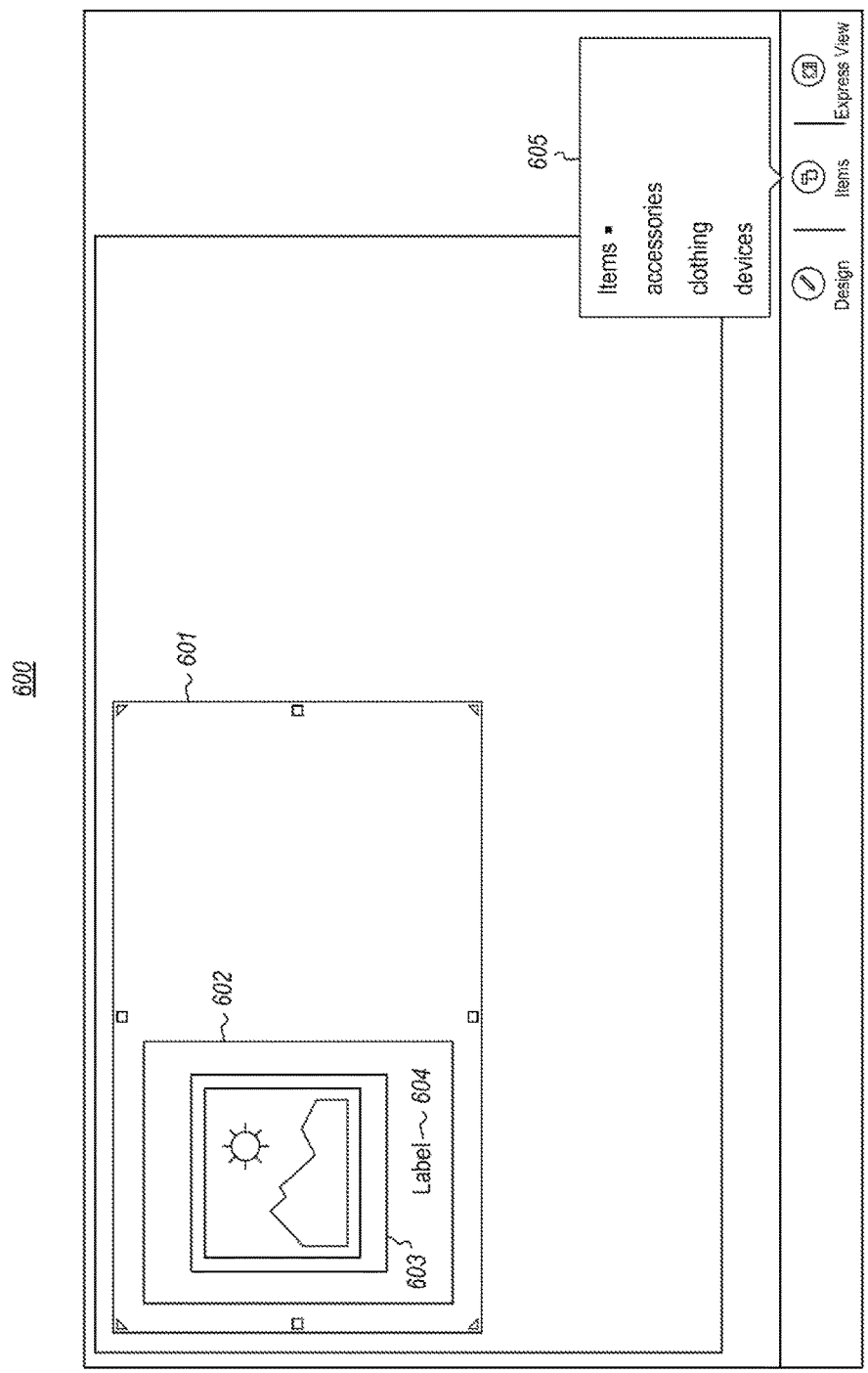
FIG. 6 illustrates a user interface in which a gallery control is illustrated, along with a list of available data sources for binding to that gallery control.

A particular example user experience will now be described with respect to the user interface of FIGS. 6 through 11. FIG. 6 illustrates a user interface 600 in which a gallery control 601 is illustrated. A gallery control can include multiple item controls. However, only a single item control 602 is illustrated for now. Thus, the gallery control 601 contains the item control 602. The item control 602 also includes several controls including an image control 603 and a label control 604. Thus, the gallery control has a hierarchical structure of controls. In the state of FIG. 6, the properties of the controls have a default value and/or are vacant as they have yet to be bound to a data source.

However, the user is not left to their own devices to try to find a data source to bind values to the gallery control 601. Instead, the user interface 600 provides an available data source list 605. The available data sources include an automobile data source, a clothing data source, and a devices data source. The suggested list of available data sources may have been generated by, for example, performing method 500 all the way through act 511, in which the available data source list is presented to the user.

Figure 7:
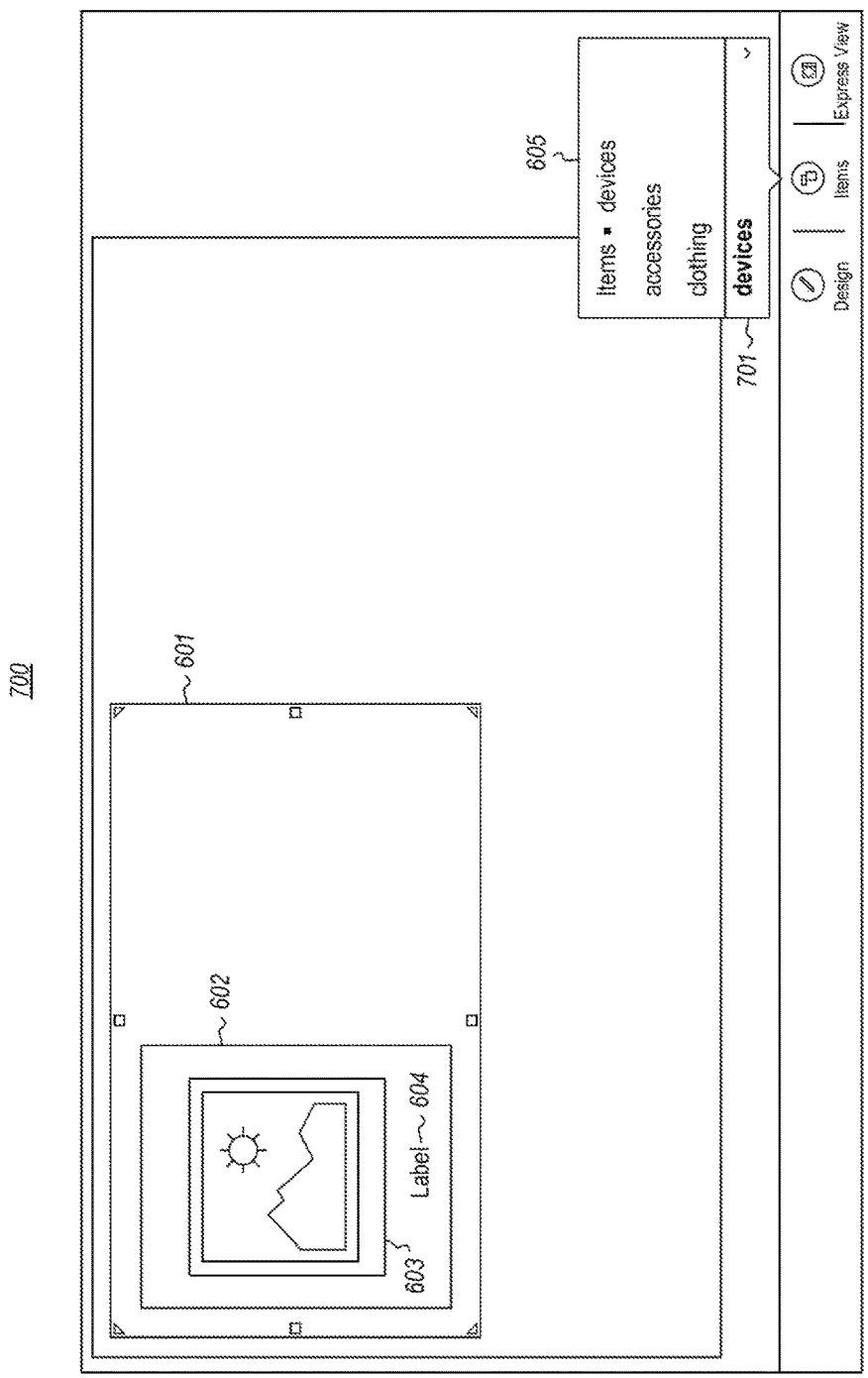
FIG. 7 illustrates a user interface that is similar to that of FIG. 6, except that the user selects the devices data.

FIG. 7 illustrates a user interface 700 that is similar to that of FIG. 6, except that the user selects the devices data source as represented by highlighting 701. Thus, the computing system detects the selection of the devices data source (an example of act 512), thus associating the devices data source with the gallery control 601.

Figure 8:
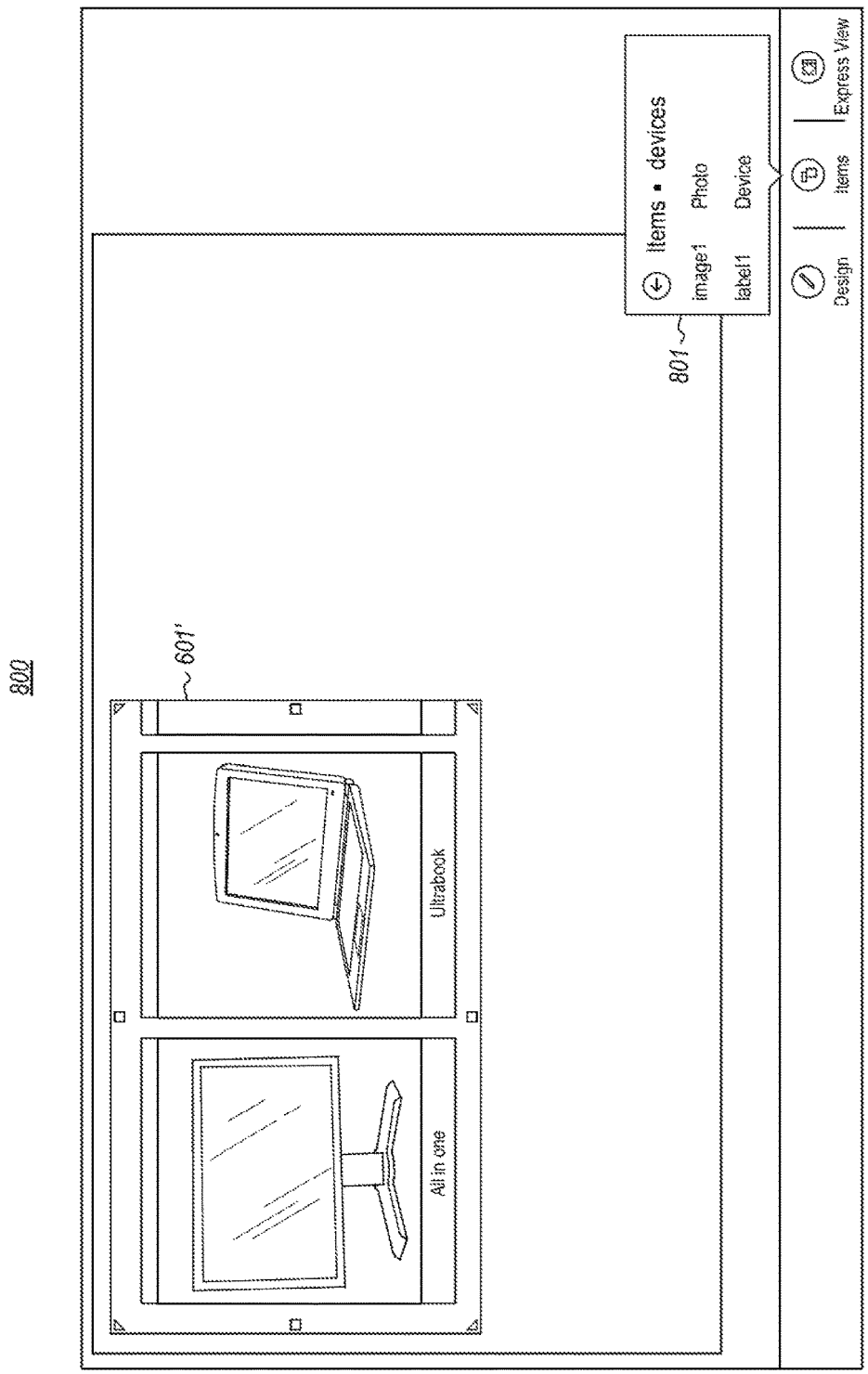
FIG. 8 illustrates a user interface that shows a response of the gallery control in view of a default binding of fields of the devices data source to properties of the gallery control.

FIG. 8 illustrates a user interface 800 that shows a response of the gallery control 601' in view of a default binding of fields of the devices data source to properties of the gallery control 601'. Since the item control is a repeatable composition within the context of the gallery control, an appropriate repeatable field (e.g., a column) of the device data structure is bound to create multiple items, one for each row of the devices data source. Element 801 shows the default binding to the user. The image control is populated appropriately with an image, and the label is populated with descriptive text of what is in the image. This default binding is an example of the result from the method 400 of FIG. 4.

Figure 9:
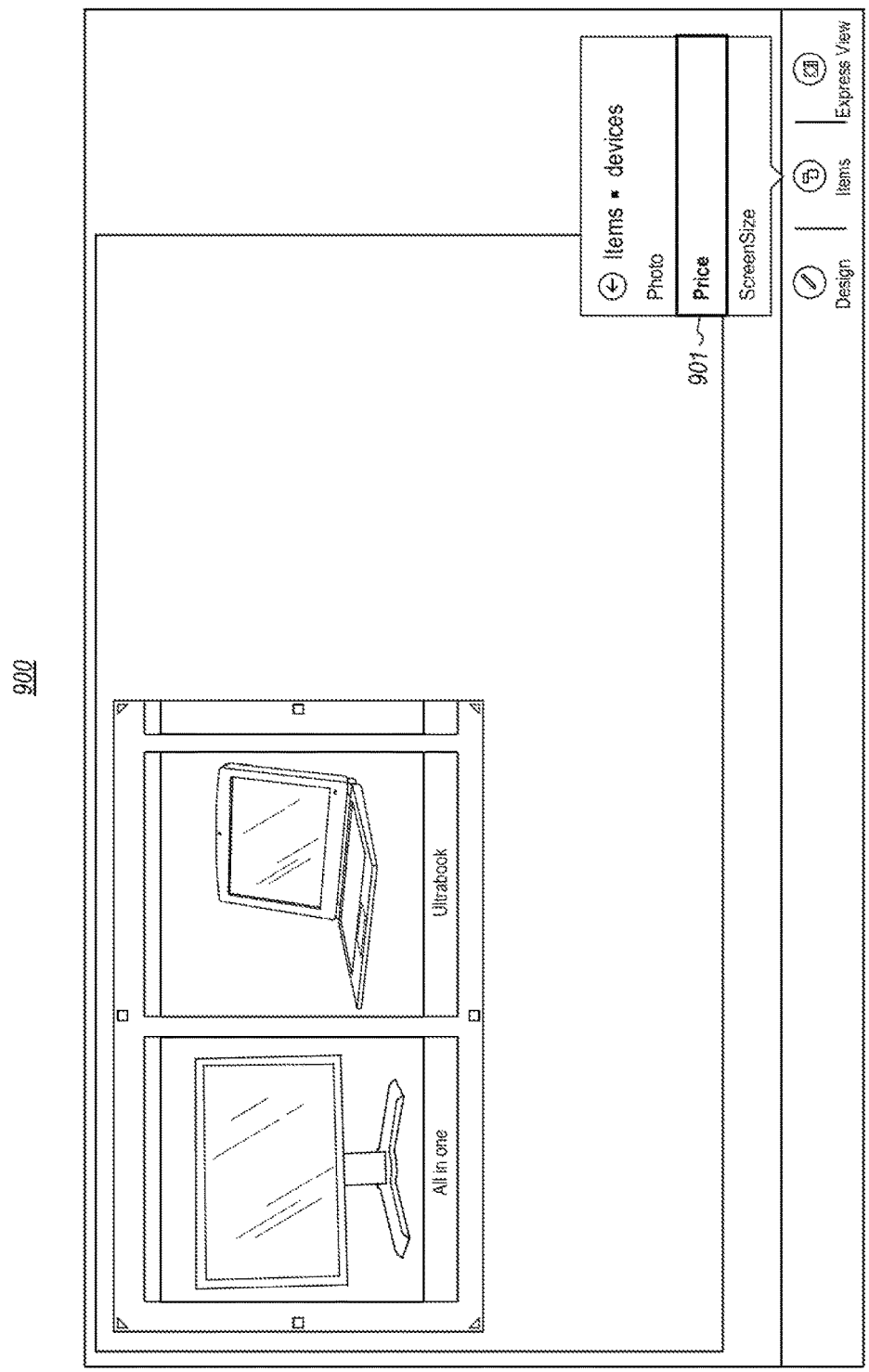
FIG. 9 illustrates a user interface that shows the user reviewing and changing the binding associated with the label.

FIG. 9 illustrates a user interface 900 that shows that the user changes the binding associated with the label. Here, the user selects that the price is to be used in the label, rather than the description. Thus, as represented by highlighting 901 the price column of the devices data source is mapped to the label control of the repeatable item controls. Other alternatives for the user to select were the screensize, and others outside of the view. When performing act 413, the computing system determined that there were a number of string fields that could be used to bind to the text property of the label control. While in act 414, the computing system bound the description text column of the devices data control to the label text property (as shown in FIG. 8), the user was presented with the alternatives, and could easily switch the binding (as shown in FIG. 9). The user never had to have personal knowledge of the hierarchy of the gallery control, nor an understanding of the schema of the data source. Instead, the user was presented with flat lists of available bindings for the properties. Thus, this user experience allows a non-programmer to participate in binding complex data to complex controls.

Figure 10:
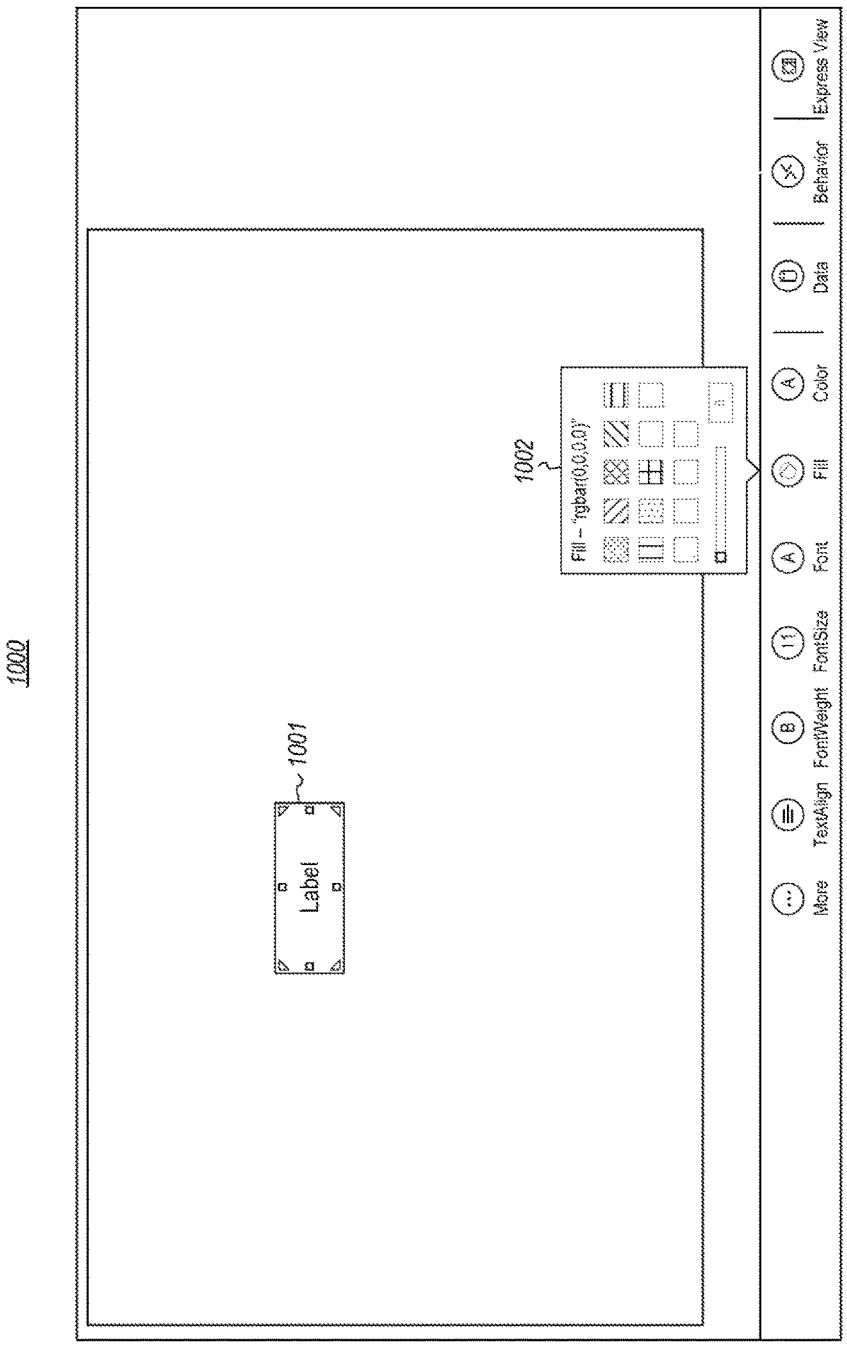
FIG. 10 illustrates a user interface that shows a color picker interface that includes a color picker control that may be used to bind a color value to the color property of a label control.
Figure 11:
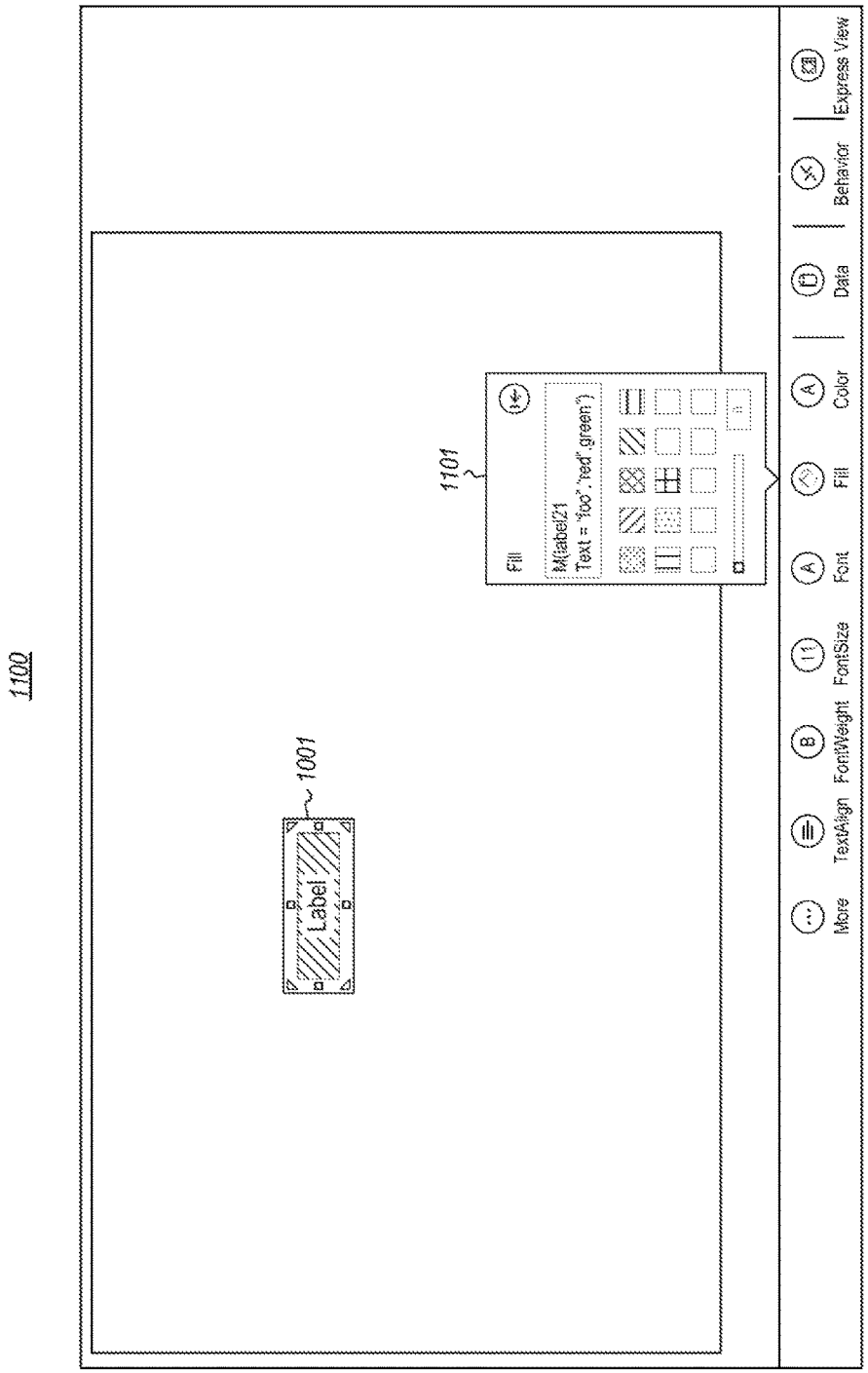
FIG. 11 shows a user interface in which the user is presented with a transformation editor that allows the user to edit the transformation that outputs the color for the label.

FIG. 10 illustrates a user interface 1000 that shows a color picker interface that includes a color picker control 1002 that may be used to bind a color value to the color property of a label control 1001. This is an example of act 412, in which the property is a color, and there is not available data from the devices data source to help in binding to the color property of the label. FIG. 11 shows a user interface 1100 in which the user is presented with a transformation editor 1101 that allows the user to edit the transformation that outputs the color for the label 1001.

The principles described herein are particular helpful in the context of authoring a recalculation user interface, as a non-programmer may more easily and intuitively bind complex data to complex controls, even while those controls are under construction. For instance, each of the controls 220 may be controls included within a recalculation user interface.

In this description and in the claims, a "recalculation user interface" is an interface with which a user may interact and which occurs in an environment in which there are one or more data sources and one or more data sinks. Furthermore, there is a set of transformations that may each be declaratively defined between one or more data sources and a data sink. For instance, the output of one data source is fed into the transformation, and the result from the transformation is then provided to the data sink, resulting in potentially some kind of change in visualization to the user.

The transformations are "declarative" in the sense that a user without specific coding knowledge can write the declarations that define the transformation. As the transformation is declaratively defined, a user may change the declarative transformation. In response, a recalculation is performed, resulting in perhaps different data being provided to the data sinks.

A classic example of a recalculation user interface is a spreadsheet document. A spreadsheet document includes a grid of cells. Initially, the cells are empty, and thus any cell of the spreadsheet program has the potential to be a data source or a data sink, depending on the meaning and context of declarative expressions inputted by a user. For instance, a user might select a given cell, and type an expression into that cell. The expression might be as simple as an expressed scalar value to be assigned to that cell. That cell may later be used as a data source. Alternatively, the expression for a given cell might be in the form of an equation in which input values are taken from one or more other cells. In that case, the given cell is a data sink that displays the result of the transformation. However, during continued authoring, that cell may be used as a data sink for yet other transformations declaratively made by the author.

The author of a spreadsheet document need not be an expert on imperative code. The author is simply making declarations that define a transformation, and selecting corresponding data sinks and data sources. FIGS. 15 through 19 described hereinafter provide a more generalized declarative authoring environment in which a more generalized recalculation user interface is described. In that subsequently described environment, visualized controls may serve as both data sources and data sinks. Furthermore, the declarative transformations may be more intuitively authored by simple manipulations of those controls.

Figure 12:
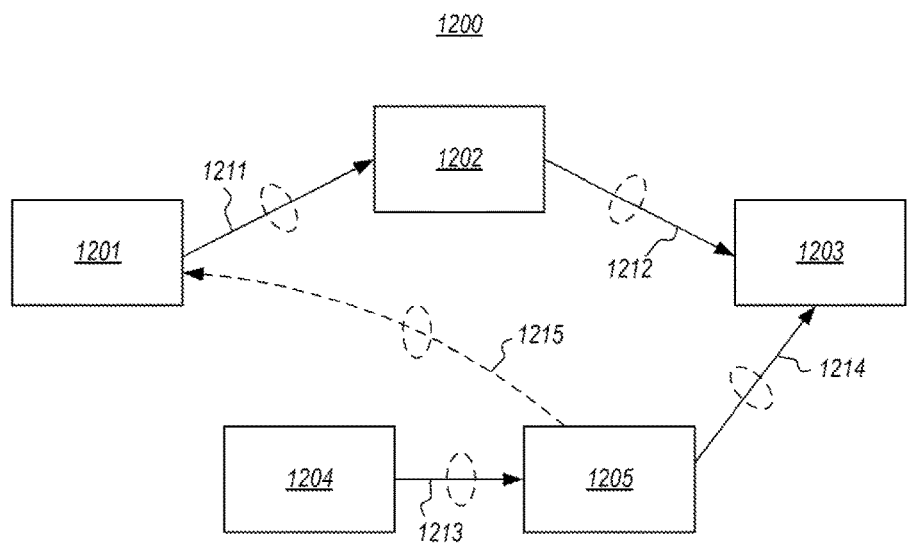
FIG. 12 abstractly illustrates an example recalculation user interface, which illustrates several data sources and data sinks with intervening transforms, and is used as a specific example provided to explain the broader principles described herein.

FIG. 12 abstractly illustrates an example recalculation user interface 1200, which is a specific example provided to explain the broader principles described herein. The recalculation user interface 1200 is just an example as the principles describe herein may be applied to any recalculation user interface to create a countless variety of recalculation user interfaces for a countless variety of applications.

The recalculation user interface 1200 includes several declarative transformations 1211 through 1215. The dashed circle around each of the arrows representing the transformations 1211 through 1216 symbolizes that the transformation s are each in declarative form.

In this specific example of FIG. 12, the transform 1211 includes respective data source 1201 and data sink 1202. Note that a data sink for one transform may also be a data source for another transform. For instance, data sink 1202 for transform 1211 also serves as a data source for the transform 1212. Furthermore, a transform may have multiple data sources. Thus, the transform chain can be made hierarchical, and thus quite complex. For instance, the transform 1212 includes data source 1202 and data sink 1203. The data sink 1203 includes two data sources; namely data source 1202 for transform 1212, and data source 1205 for transform 1214. That said, perhaps a single transform leads the two data sources 1202 and 1205 into the data sink 1203. The transform 1213 includes a data source 204 and a data sink 1205.

If the recalculation user interface were a spreadsheet document, for example, the various data sources/sinks 1201 through 1205 might be spreadsheet cells, in which case the transforms represent the expression that would be associated with each data sink. The output of each expression is displayed within the cell. Thus, in the case of a spreadsheet. The data sources/sinks might be complex visualized controls that have both include input parameters to and output parameters from the transformation chain. For instance, in FIG. 12, there is an additional declarative transformation 1215 that leads from data source 1205 into data sink 1201. Thus, the data source/sink 1201 might visualize information representing an output from transform 1215, as well as provide further data to other data sinks.

Recalculation user interfaces do not need to have visualization controls. One example of this is a recalculation user interface meant to perform a transformation-based computation, consuming source data and updating sink data, with no information displayed to the user about the computation in the normal case. For instance, the recalculation user interface might support a background computation. A second example is a recalculation user interface that has output controls that operate external actuators, such as the valves in the process control example. Such controls are like display controls in that their states are controlled by results of the transformation computation and on signal inputs. However, here, the output is a control signal to a device rather than a visualization to a display. Consider, for example, a recalculation user interface for controlling a robot. This recalculation user interface might have rules for robot actions and behavior that depend on inputs robot sensors like servo positions and speeds, ultrasonic range-finding measurements, and so forth. Or consider a process control application based on a recalculation user interface that takes signals from equipment sensors like valve positions, fluid flow rates, and so forth.

Figure 13:
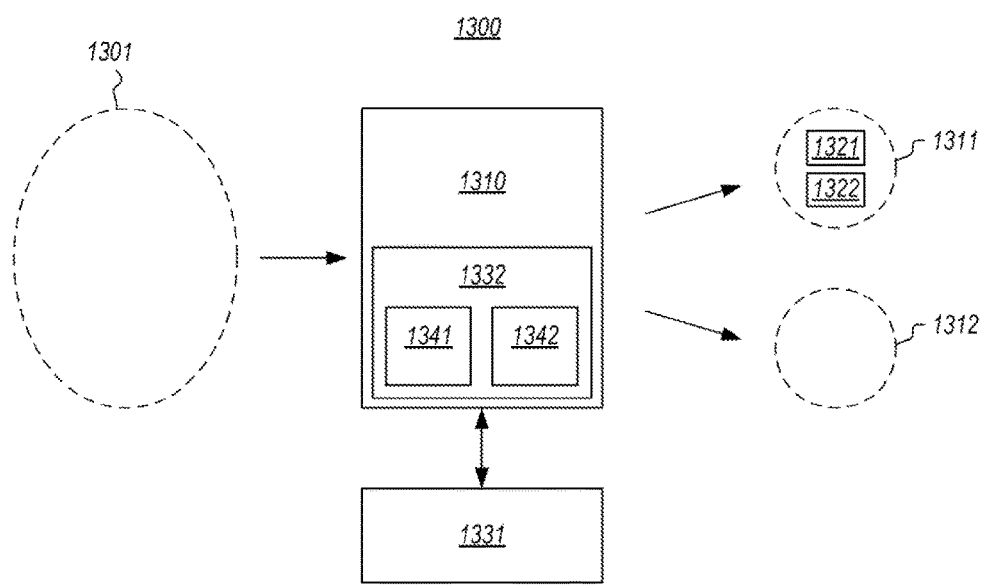
FIG. 13 illustrates an example compilation environment that includes a compiler that accesses the transformation chain and produces compiled code as well as a dependency chain.
Figure 14:
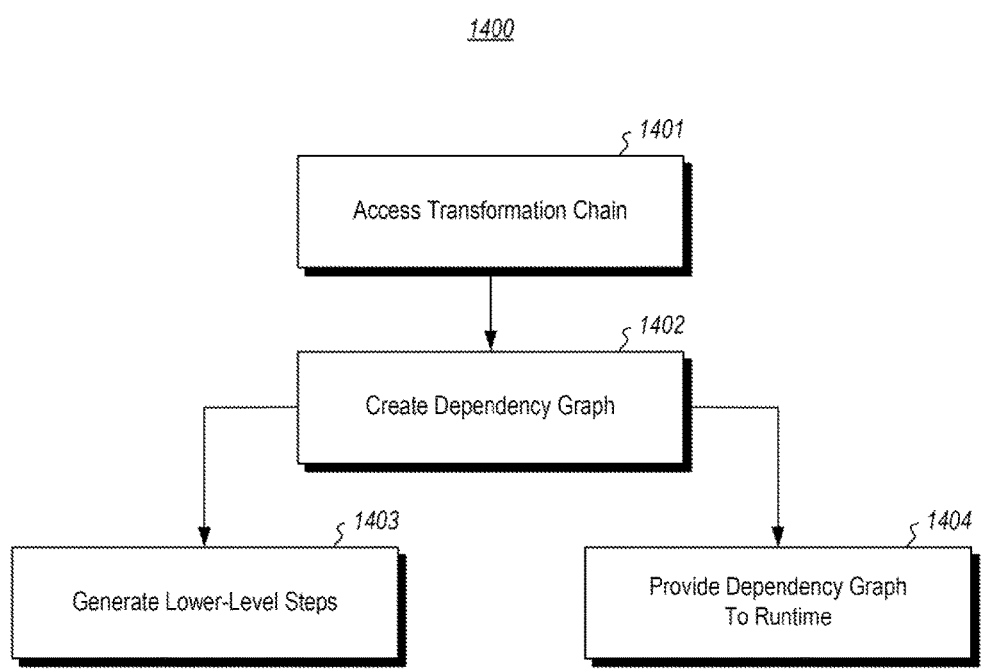
FIG. 14 illustrates a flowchart of a method for compiling a transformation chain of a recalculation user interface.

FIG. 13 illustrates an example compilation environment 1300 that includes a compiler 1310 that accesses the transformation chain 1301. An example, of the transformation chain 301 is the transformation chain 1200 of FIG. 12. FIG. 14 illustrates a flowchart of a method 1400 for compiling a transformation chain of a recalculation user interface. The method 1400 may be performed by the compiler 1310 of FIG. 13. In one embodiment, the method 1400 may be performed by the computing system 100 in response to the processor(s) 102 executing computer-executable instructions embodied on one or more computer-readable storage media.

The method 1400 includes analyzing a transformation chain of the recalculation user interface for dependencies (act 1401). For instance, referring to FIG. 12, the compiler 1300 might analyze each of the transformations 1211 through 1215. The transformations are declarative and thus the dependencies can be extracted more easily than they could if the transformations were expressed using an imperative computer language.

Based on the analysis, a dependency graph is created (act 1402) between entities referenced in the transformations. Essentially, the dependencies have a source entity that represents an event, and a target entity that represents that the evaluation of that target entity depends on the event. An example of the event might be a user event in which the user interacts in a certain way with the recalculation user interface. As another example, the event might be an inter-entity event in which if the source entity is evaluated, then the target entity of the dependency should also be evaluated.

The compiler then creates lower-level execution steps based on the dependency graph (act 1403). The lower-level execution steps might be, for instance, imperative language code. Imperative language code is adapted to respond to detect events, reference an event chart to determine a function to execute, and execute that function. Accordingly, each of the dependencies in the dependency graph may be reduced to a function. The dependency graph itself may be provided to the runtime (act 1404). The imperative language code may be, for example, a script language, such as JAVASCRIPT. However, the principles described herein are not limited to the imperative language code being of any particular language.

As an example, FIG. 13 illustrates that the compiler 1310 generates lower-level code 1311 as well. Such lower level code 1311 includes a compilation of each of the transformations in the transformation chain. For instance, lower level code 1311 is illustrated as including element 1321 representing the compilation of each of the transformations in the transformation chain. In the context of FIG. 12, the element 1321 would include a compilation of each of the transformations 1211 through 1215. The lower level code 1311 also includes a variety of functions 322. A function is generated for each dependency in the dependency graph. The functions may be imperative language functions.

When the imperative language runtime detects an event that is listed in the dependency graph, the corresponding function within the compiled functions 1322 is also executed. Accordingly, with all transformations being properly compiled, and with each of the dependencies on particular events being enforced by dedicated functions, the declarative recalculation user interface is properly represented as an imperative language code.

Accordingly, an effective mechanism has been described for compiling a declarative recalculation user interface. In addition, the runtime is provided with a dependency graph, rather than a more extensive interpreter.

A specific example of an authoring pipeline for allowing non-programmers to author programs having complex behaviors using a recalculation user interface will now be described with respect to FIGS. 15 through 19.

Figure 15:
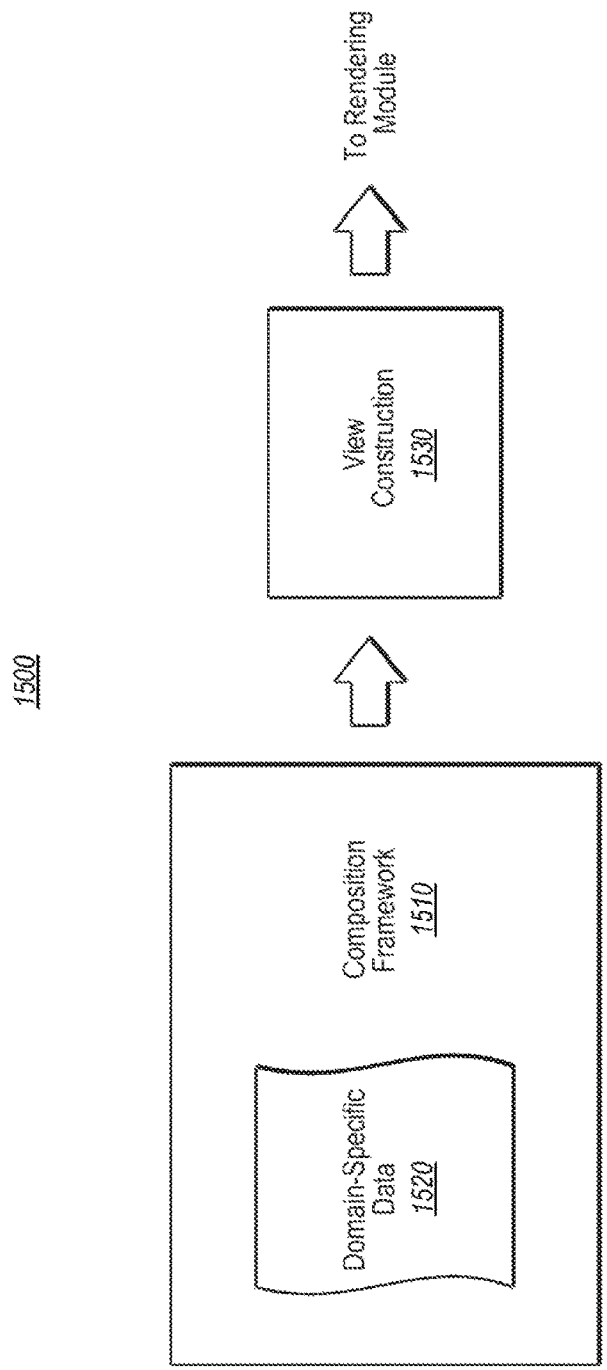
FIG. 15 illustrates an environment in which the principles of the present invention may be employed including a data-driven composition framework that constructs a view composition that depends on input data.

FIG. 15 illustrates a visual composition environment 1500 that may be used to construct an interactive visual composition in the form of a recalculation user interface. The construction of the recalculation user interface is performed using data-driven analytics and visualization of the analytical results. The environment 1500 includes a composition framework 1510 that performs logic that is performed independent of the problem-domain of the view composition 1530. For instance, the same composition framework 1510 may be used to compose interactive view compositions for city plans, molecular models, grocery shelf layouts, machine performance or assembly analysis, or other domain-specific renderings.

The composition framework 1510 uses domain-specific data 1520, however, to construct the actual visual composition 1530 that is specific to the domain. Accordingly, the same composition framework 1510 may be used to construct recalculation user interfaces for any number of different domains by changing the domain-specific data 1520, rather than having to recode the composition framework 1510 itself. Thus, the composition framework 1510 of the pipeline 1500 may apply to a potentially unlimited number of problem domains, or at least to a wide variety of problem domains, by altering data, rather than recoding and recompiling. The view composition 1530 may then be supplied as instructions to an appropriate 2-D or 3-D rendering module. The architecture described herein also allows for convenient incorporation of pre-existing view composition models as building blocks to new view composition models. In one embodiment, multiple view compositions may be included in an integrated view composition to allow for easy comparison between two possible solutions to a model.

Figure 16:
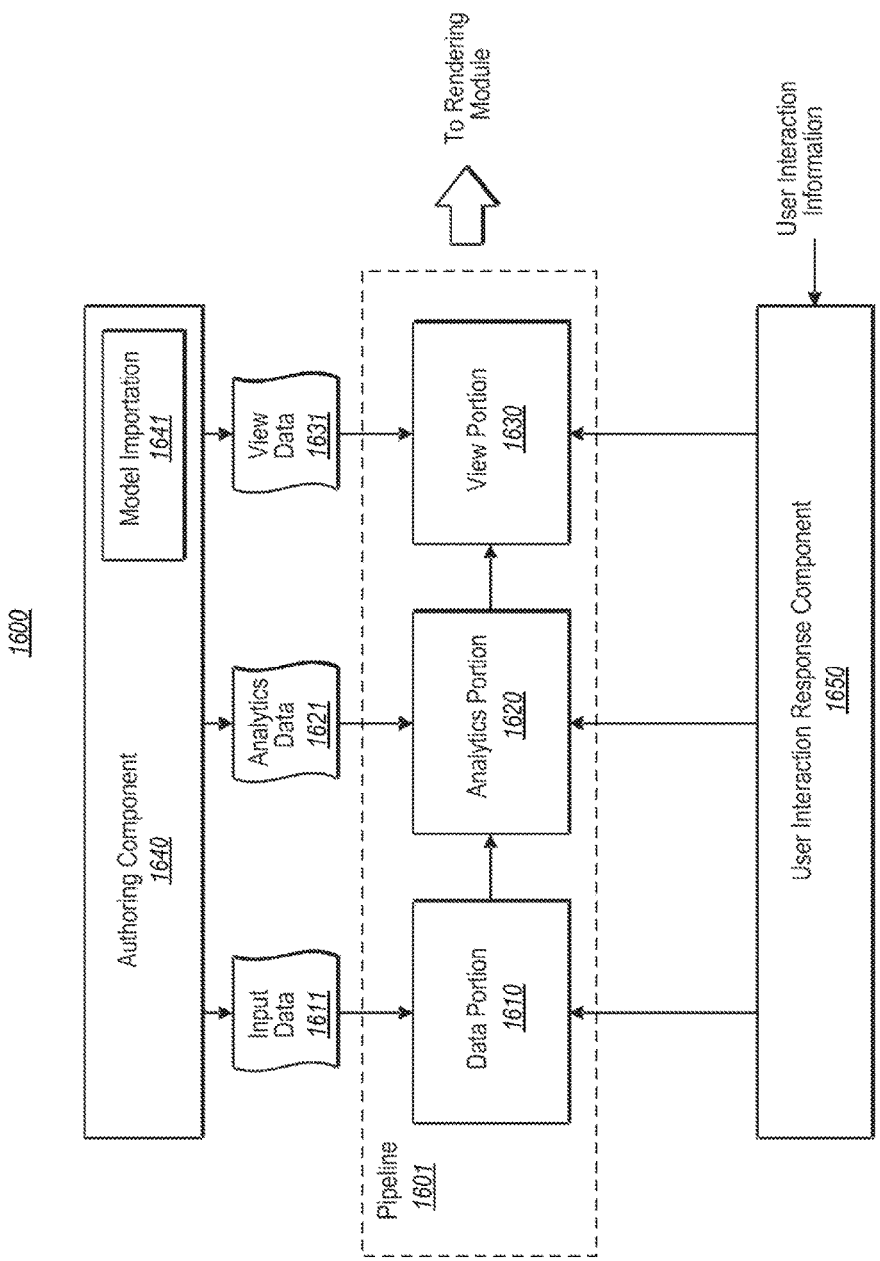
FIG. 16 illustrates a pipeline environment that represents one example of the environment of FIG. 15.

FIG. 16 illustrates an example architecture of the composition framework 510 in the form of a pipeline environment 1600. The pipeline environment 1600 includes, amongst other things, the pipeline 1601 itself. The pipeline 1601 includes a data portion 1610, an analytics portion 1620, and a view portion 1630, which will each be described in detail with respect to subsequent FIGS. 17 through 19, respectively, and the accompanying description. For now, at a general level, the data portion 1610 of the pipeline 1601 may accept a variety of different types of data and presents that data in a canonical form to the analytics portion 1620 of the pipeline 1601. The analytics portion 1620 binds the data to various model parameters, and solves for the unknowns in the model parameters using model analytics. The various parameter values are then provided to the view portion 1630, which constructs the composite view using those values if the model parameters. For instance, the data portion 610 may offer up data sources to the recalculation user interface.

The pipeline environment 1600 also includes an authoring component 1640 that allows an author or other user of the pipeline 1601 to formulate and/or select data to provide to the pipeline 1601. For instance, the authoring component 1640 may be used to supply data to each of data portion 1610 (represented by input data 1611), analytics portion 1620 (represented by analytics data 1621), and view portion 1630 (represented by view data 1631). The various data 1611, 1621 and 1631 represent an example of the domain-specific data 1520 of FIG. 15, and will be described in much further detail hereinafter. The authoring component 1640 supports the providing of a wide variety of data including for example, data schemas, actual data to be used by the model, the location or range of possible locations of data that is to be brought in from external sources, visual (graphical or animation) objects, user interface interactions that can be performed on a visual, modeling statements (e.g., views, equations, constraints), bindings, and so forth. In one embodiment, the authoring component is but one portion of the functionality provided by an overall manager component (not shown in FIG. 16, but represented by the composition framework 1510 of FIG. 15). The manager is an overall director that controls and sequences the operation of all the other components (such as data connectors, solvers, viewers, and so forth) in response to events (such as user interaction events, external data events, and events from any of the other components such as the solvers, the operating system, and so forth).

In the pipeline environment 1600 of FIG. 16, the authoring component 1640 is used to provide data to an existing pipeline 1601, where it is the data that drives the entire process from defining the input data, to defining the analytical model (referred to above as the "transformation chain"), to defining how the results of the transformation chain are visualized in the view composition. Accordingly, one need not perform any coding in order to adapt the pipeline 1601 to any one of a wide variety of domains and problems. Only the data provided to the pipeline 1601 is what is to change in order to apply the pipeline 1601 to visualize a different view composition either from a different problem domain altogether, or to perhaps adjust the problem solving for an existing domain. Further, since the data can be changed at use time (i.e., run time), as well as at author time, the model can be modified and/or extended at runtime. Thus, there is less, if any, distinction between authoring a model and running the model. Because all authoring involves editing data items and because the software runs all of its behavior from data, every change to data immediately affects behavior without the need for recoding and recompilation.

The pipeline environment 1600 also includes a user interaction response module 1650 that detects when a user has interacted with the displayed view composition, and then determines what to do in response. For example, some types of interactions might require no change in the data provided to the pipeline 1601 and thus require no change to the view composition. Other types of interactions may change one or more of the data 1611, 1621, or 1631. In that case, this new or modified data may cause new input data to be provided to the data portion 1610, might require a reanalysis of the input data by the analytics portion 1620, and/or might require a re-visualization of the view composition by the view portion 1630.

Accordingly, the pipeline 1601 may be used to extend data-driven analytical visualizations to perhaps an unlimited number of problem domains, or at least to a wide variety of problem domains. Furthermore, one need not be a programmer to alter the view composition to address a wide variety of problems. Each of the data portion 1610, the analytics portion 1620 and the view portion 1630 of the pipeline 1601 will now be described with respect to respective data portion 1700 of FIG. 17, the analytics portion 1800 of FIG. 18, and the view portion 1900 of FIG. 19, in that order. As will be apparent from FIGS. 17 through 19, the pipeline 1601 may be constructed as a series of transformation component where they each 1) receive some appropriate input data, 2) perform some action in response to that input data (such as performing a transformation on the input data), and 3) output data which then serves as input data to the next transformation component.

Figure 17:
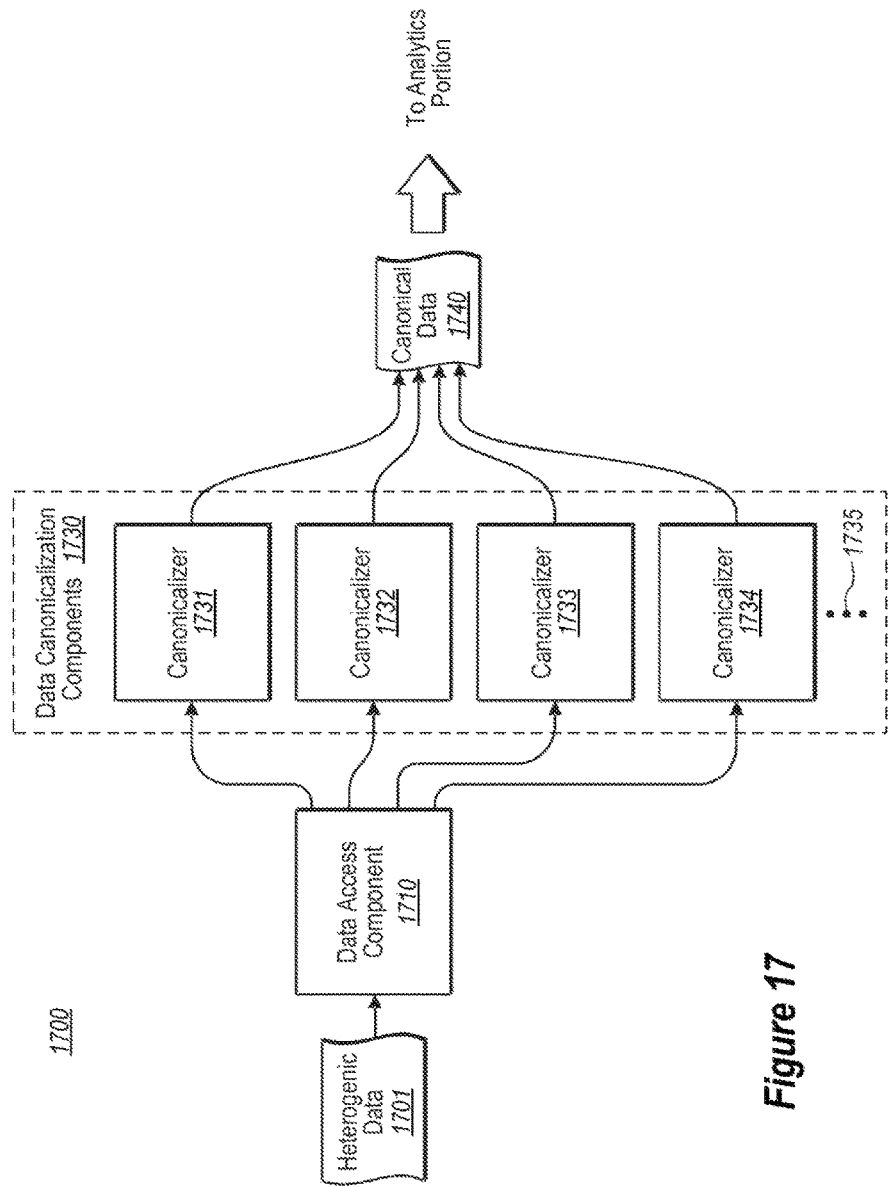
FIG. 17 schematically illustrates an embodiment of the data portion of the pipeline of FIG. 16.

FIG. 17 illustrates just one of many possible embodiments of a data portion 1700 of the pipeline 1601 of FIG. 16. One of the functions of the data portion 1700 is to provide data in a canonical format that is consistent with schemas understood by the analytics portion 1800 of the pipeline discussed with respect to FIG. 18. The data portion includes a data access component 1710 that accesses the heterogenic data 1701. The input data 1701 may be "heterogenic" in the sense that the data may (but need not) be presented to the data access component 1710 in a canonical form. In fact, the data portion 1700 is structured such that the heterogenic data could be of a wide variety of formats. Examples of different kinds of domain data that can be accessed and operated on by models include text and XML documents, tables, lists, hierarchies (trees), SQL database query results, BI (business intelligence) cube query results, graphical information such as 2D drawings and 3D visual models in various formats, and combinations thereof (i.e., a composite). Further, the kind of data that can be accessed can be extended declaratively, by providing a definition (e.g., a schema) for the data to be accessed. Accordingly, the data portion 1700 permits a wide variety of heterogenic input into the model, and also supports runtime, declarative extension of accessible data types.

In one embodiment, the data access portion 1700 includes a number of connectors for obtaining data from a number of different data sources. Since one of the primary functions of the connector is to place corresponding data into canonical form, such connectors will often be referred to hereinafter and in the drawings as "canonicalizers". Each canonicalizer might have an understanding of the specific Application Program Interfaces (API's) of its corresponding data source. The canonicalizer might also include the corresponding logic for interfacing with that corresponding API to read and/or write data from and to the data source. Thus, canonicalizers bridge between external data sources and the memory image of the data.

The data access component 1710 evaluates the input data 1701. If the input data is already canonical and thus processable by the analytics portion 1800, then the input data may be directly provided as canonical data 1740 to be input to the analytics portion 1800.

However, if the input data 1701 is not canonical, then the appropriate data canonicalization component 1730 is able to convert the input data 1701 into the canonical format. The data canonicalization components 1730 are actually a collection of data canonicalization components 1730, each capable of converting input data having particular characteristics into canonical form. The collection of canonicalization components 1730 is illustrated as including four canonicalization components 1731, 1732, 1733 and 1734. However, the ellipses 1735 represents that there may be other numbers of canonicalization components as well, perhaps even fewer that the four illustrated.

The input data 1701 may even include a canonicalizer itself as well as an identification of correlated data characteristic(s). The data portion 1700 may then register the correlated data characteristics, and provide the canonicalization component to the data canonicalization component collection 1730, where it may be added to the available canonicalization components. If input data is later received that has those correlated characteristics, the data portion 1710 may then assign the input data to the correlated canonicalization component. Canonicalization components can also be found dynamically from external sources, such as from defined component libraries on the web. For example, if the schema for a given data source is known but the needed canonicalizer is not present, the canonicalizer can be located from an external component library, provided such a library can be found and contains the needed components. The pipeline might also parse data for which no schema is yet known and compare parse results versus schema information in known component libraries to attempt a dynamic determination of the type of the data, and thus to locate the needed canonicalizer components.

Alternatively, instead of the input data including all of the canonicalization component, the input data may instead provide a transformation definition defining canonicalization transformations. The collection 1730 may then be configured to convert that transformations definition into a corresponding canonicalization component that enforces the transformations along with zero or more standard default canonicalization transformation. This represents an example of a case in which the data portion 1700 consumes the input data and does not provide corresponding canonicalized data further down the pipeline. In perhaps most cases, however, the input data 1701 results in corresponding canonicalized data 1740 being generated.

In one embodiment, the data portion 1710 may be configured to assign input data to the data canonicalization component on the basis of a file type and/or format type of the input data. Other characteristics might include, for example, a source of the input data. A default canonicalization component may be assigned to input data that does not have a designated corresponding canonicalization component. The default canonicalization component may apply a set of rules to attempt to canonicalize the input data. If the default canonicalization component is not able to canonicalize the data, the default canonicalization component might trigger the authoring component 1540 of FIG. 15 to prompt the user to provide a schema definition for the input data. If a schema definition does not already exist, the authoring component 1540 might present a schema definition assistant to help the author generate a corresponding schema definition that may be used to transform the input data into canonical form. Once the data is in canonical form, the schema that accompanies the data provides sufficient description of the data that the rest of the pipeline 1601 does not need new code to interpret the data. Instead, the pipeline 1601 includes code that is able to interpret data in light of any schema that is expressible an accessible schema declaration language.

Regardless, canonical data 1740 is provided as output data from the data portion 1700 and as input data to the analytics portion 1800. The canonical data might include fields that include a variety of data types. For instance, the fields might includes simple data types such as integers, floating point numbers, strings, vectors, arrays, collections, hierarchical structures, text, XML documents, tables, lists, SQL database query results, BI (business intelligence) cube query results, graphical information such as 2D drawings and 3D visual models in various formats, or even complex combinations of these various data types. As another advantage, the canonicalization process is able to canonicalize a wide variety of input data. Furthermore, the variety of input data that the data portion 1700 is able to accept is expandable. This is helpful in the case where multiple models are combined as will be discussed later in this description.

Figure 18:
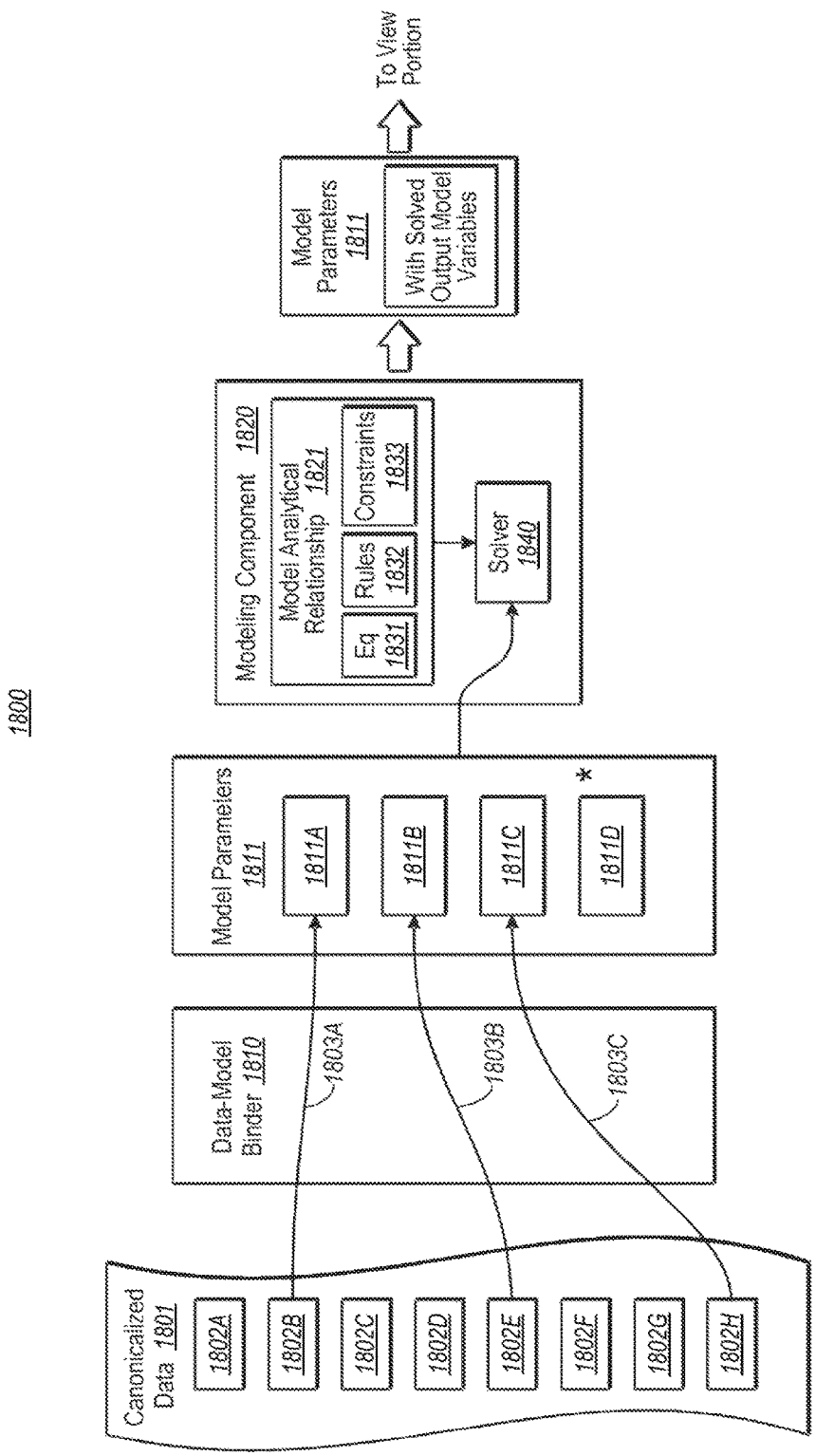
FIG. 18 schematically illustrates an embodiment of the analytics portion of the pipeline of FIG. 16.

FIG. 18 illustrates analytics portion 1800 which represents an example of the analytics portion 1620 of the pipeline 1601 of FIG. 16. The data portion 1700 provided the canonicalized data 1801 to the data-model binding component 1810. While the canonicalized data 1801 might have any canonicalized form, and any number of parameters, where the form and number of parameters might even differ from one piece of input data to another. For purposes of discussion, however, the canonical data 1801 has fields 1802A through 1802H, which may collectively be referred to herein as "fields 1802".

On the other hand, the analytics portion 1800 includes a number of model parameters 1811. The type and number of model parameters may differ according to the model. However, for purposes of discussion of a particular example, the model parameters 811 will be discussed as including model parameters 1811A, 1811B, 1811C and 1811D. In one embodiment, the identity of the model parameters, and the analytical relationships between the model parameters may be declaratively defined without using imperative coding.

A data-model binding component 1810 intercedes between the canonicalized data fields 1802 and the model parameters 1811 to thereby provide bindings between the fields. In this case, the data field 1802B is bound to model parameter 1811A as represented by arrow 1803A. In other words, the value from data field 1802B is used to populate the model parameter 1811A. Also, in this example, the data field 1802E is bound to model parameter 1811B (as represented by arrow 1803B), and data field 1802H is bound to model parameter 1811C (as represented by arrow 803C).

The data fields 1802A, 1802C, 1802D, 1802F and 1802G are not shown bound to any of the model parameters. This is to emphasize that not all of the data fields from input data are always required to be used as model parameters. In one embodiment, one or more of these data fields may be used to provide instructions to the data-model binding component 810 on which fields from the canonicalized data (for this canonicalized data or perhaps any future similar canonicalized data) are to be bound to which model parameter. This represents an example of the kind of analytics data 1621 that may be provided to the analytics portion 1620 of FIG. 16. The definition of which data fields from the canonicalized data are bound to which model parameters may be formulated in a number of ways. For instance, the bindings may be 1) explicitly set by the author at authoring time, 2) explicit set by the user at use time (subject to any restrictions imposed by the author), 3) automatic binding by the authoring component 1640 based on algorithmic heuristics, and/or 4) prompting by the authoring component of the author and/or user to specify a binding when it is determined that a binding cannot be made algorithmically. Thus bindings may also be resolved as part of the model logic itself.

The ability of an author to define which data fields are mapped to which model parameters gives the author great flexibility in being able to use symbols that the author is comfortable with to define model parameters. For instance, if one of the model parameters represents pressure, the author can name that model parameter "Pressure" or "P" or any other symbol that makes sense to the author. The author can even rename the model parameter which, in one embodiment, might cause the data model binding component 1810 to automatically update to allow bindings that were previously to the model parameter of the old name to instead be bound to the model parameter of the new name, thereby preserving the desired bindings. This mechanism for binding also allows binding to be changed declaratively at runtime.

The model parameter 1811D is illustrated with an asterisk to emphasize that in this example, the model parameter 1811D was not assigned a value by the data-model binding component 1810. Accordingly, the model parameter 1811D remains an unknown. In other words, the model parameter 1811D is not assigned a value.

The modeling component 1820 performs a number of functions. First, the modeling component 1820 defines analytical relationships 1821 between the model parameters 1811. The analytical relationships 1821 are categorized into three general categories including equations 1831, rules 1832 and constraints 1833. However, the list of solvers is extensible. In one embodiment, for example, one or more simulations may be incorporated as part of the analytical relationships provided a corresponding simulation engine is provided and registered as a solver.

The term "equation" as used herein aligns with the term as it is used in the field of mathematics.

The term "rules" as used herein means a conditional statement where if one or more conditions are satisfied (the conditional or "if" portion of the conditional statement), then one or more actions are to be taken (the consequence or "then" portion of the conditional statement). A rule is applied to the model parameters if one or more model parameters are expressed in the conditional statement, or one or more model parameters are expressed in the consequence statement.

The term "constraint" as used herein means that a restriction is applied to one or more model parameters. For instance, in a city planning model, a particular house element may be restricted to placement on a map location that has a subset of the total possible zoning designations. A bridge element may be restricted to below a certain maximum length, or a certain number of lanes.

An author that is familiar with the model may provide expressions of these equations, rules and constraint that apply to that model. In the case of simulations, the author might provide an appropriate simulation engine that provides the appropriate simulation relationships between model parameters. The modeling component 1820 may provide a mechanism for the author to provide a natural symbolic expression for equations, rules and constraints. For example, an author of a thermodynamics related model may simply copy and paste equations from a thermodynamics textbook. The ability to bind model parameters to data fields allows the author to use whatever symbols the author is familiar with (such as the exact symbols used in the author's relied-upon textbooks) or the exact symbols that the author would like to use.

Prior to solving, the modeling component 1820 also identifies which of the model parameters are to be solved for (i.e., hereinafter, the "output model variable" if singular, or "output model variables" if plural, or "output model variable(s)" if there could be a single or plural output model variables). The output model variables may be unknown parameters, or they might be known model parameters, where the value of the known model parameter is subject to change in the solve operation. In the example of FIG. 18, after the data-model binding operation, model parameters 1811A, 1811B and 1811C are known, and model parameter 1811D is unknown. Accordingly, unknown model parameter 1811D might be one of the output model variables. Alternatively or in addition, one or more of the known model parameters 1811A, 1811B and 1811C might also be output model variables. The solver 840 then solves for the output model variable(s), if possible. In one embodiment described hereinafter, the solver 1840 is able to solve for a variety of output model variables, even within a single model so long as sufficient input model variables are provided to allow the solve operation to be performed. Input model variables might be, for example, known model parameters whose values are not subject to change during the solve operation. For instance, in FIG. 18, if the model parameters 1811A and 1811D were input model variables, the solver might instead solve for output model variables 1811B and 1811C instead. In one embodiment, the solver might output any one of a number of different data types for a single model parameter. For instance, some equation operations (such as addition, subtraction, and the like) apply regardless of the whether the operands are integers, floating point, vectors of the same, or matrices of the same.

In one embodiment, even when the solver 1840 cannot solve for a particular output model variables, the solver 1800 might still present a partial solution for that output model variable, even if a full solve to the actual numerical result (or whatever the solved-for data type) is not possible. This allows the pipeline to facilitate incremental development by prompting the author as to what information is needed to arrive at a full solve. This also helps to eliminate the distinction between author time and use time, since at least a partial solve is available throughout the various authoring stages. For an abstract example, suppose that the analytics model includes an equation a=b+c+d. Now suppose that a, c and d are output model variables, and b is an input model variable having a known value of 5 (an integer in this case). In the solving process, the solver 1840 is only able to solve for one of the output model variables "d", and assign a value of 6 (an integer) to the model parameter called "d", but the solver 840 is not able to solve for "c". Since "a" depends from "c", the model parameter called "a" also remains an unknown and unsolved for. In this case, instead of assigning an integer value to "a", the solver might do a partial solve and output the string value of "c+11" to the model parameter "a". As previously mentioned, this might be especially helpful when a domain expert is authoring an analytics model, and will essential serve to provide partial information regarding the content of model parameter "a" and will also serve to cue the author that some further model analytics needs to be provided that allow for the "c" model parameter to be solved for. This partial solve result may be perhaps output in some fashion in the view composition to allow the domain expert to see the partial result.

The solver 1840 is shown in simplified form in FIG. 18. However, the solver 1840 may direct the operation of multiple constituent solvers as will be described with respect to FIG. 19. In FIG. 18, the modeling component 1820 then makes the model parameters (including the now known and solved-for output model variables) available as output to be provided to the view portion 1900 of FIG. 19.

Figure 19:
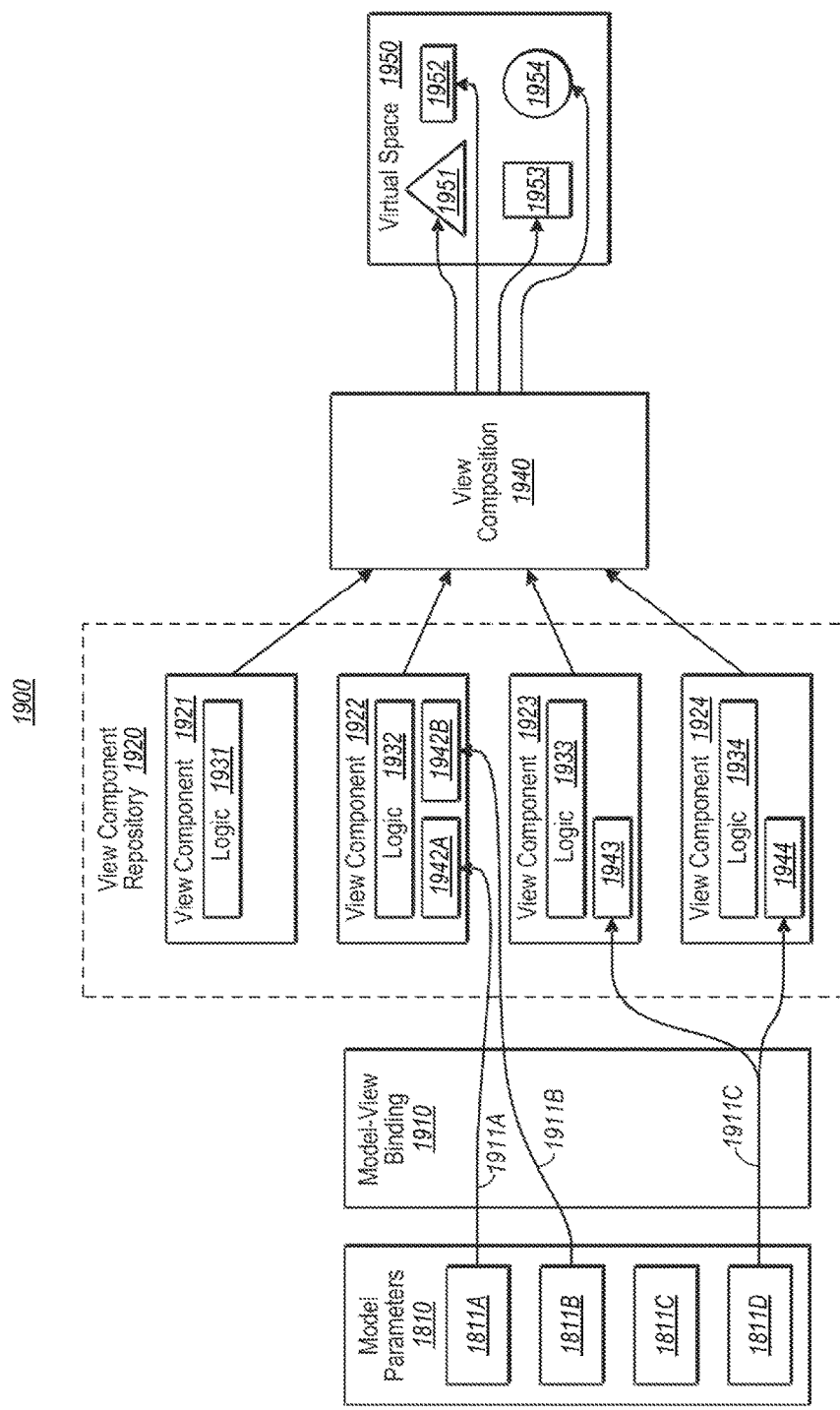
FIG. 19 schematically illustrates an embodiment of the view portion of the pipeline of FIG. 16.

FIG. 19 illustrates a view portion 1900 which represents an example of the view portion 1630 of FIG. 16, and represents example of visualized controls in the recalculation user interface 1200. The view portion 1900 receives the model parameters 1811 from the analytics portion 1800 of FIG. 18. The view portion also includes a view components repository 1920 that contains a collection of view components. For example, the view components repository 1920 in this example is illustrated as including view components 1921 through 1924, although the view components repository 1920 may contain any number of view components. The view components each may include zero or more input parameters. For example, view component 1921 does not include any input parameters. However, view component 1922 includes two input parameters 1942A and 1942B. View component 1923 includes one input parameter 1943, and view component 1924 includes one input parameter 1944. That said, this is just an example. The input parameters may, but need not necessary, affect how the visual item is rendered. The fact that the view component 1921 does not include any input parameters emphasizes that there can be views that are generated without reference to any model parameters. Consider a view that comprises just fixed (built-in) data that does not change. Such a view might for example constitute reference information for the user. Alternatively, consider a view that just provides a way to browse a catalog, so that items can be selected from it for import into a model.

Each view component 1921 through 1924 includes or is associated with corresponding logic that, when executed by the view composition component 1940 using the corresponding view component input parameter(s), if any, causes a corresponding view item to be placed in virtual space 1950. That virtual item may be a static image or object, or may be a dynamic animated virtual item or object For instance, each of view components 1921 through 1924 are associated with corresponding logic 1931 through 1934 that, when executed causes the corresponding virtual item 1951 through 1954, respectively, to be rendered in virtual space 1950. The virtual items are illustrated as simple shapes. However, the virtual items may be quite complex in form perhaps even including animation. In this description, when a view item is rendered in virtual space, that means that the view composition component has authored sufficient instructions that, when provided to the rendering engine, the rendering engine is capable if displaying the view item on the display in the designated location and in the designated manner.

The view components 1921 through 1924 may be provided perhaps even as view data to the view portion 1900 using, for example, the authoring component 1640 of FIG. 16. For instance, the authoring component 1640 might provide a selector that enables the author to select from several geometric forms, or perhaps to compose other geometric forms. The author might also specify the types of input parameters for each view component, whereas some of the input parameters may be default input parameters imposed by the view portion 1900. The logic that is associated with each view component 1921 through 1924 may be provided also a view data, and/or may also include some default functionality provided by the view portion 1900 itself.

The view portion 1900 includes a model-view binding component 1910 that is configured to bind at least some of the model parameters to corresponding input parameters of the view components 1921 through 1924. For instance, model parameter 1811A is bound to the input parameter 1942A of view component 1922 as represented by arrow 1911A. Model parameter 1811B is bound to the input parameter 1942B of view component 1922 as represented by arrow 1911B. Also, model parameter 1811D is bound to the input parameters 1943 and 1944 of view components 1923 and 1924, respectively, as represented by arrow 1911C. The model parameter 1811C is not shown bound to any corresponding view component parameter, emphasizing that not all model parameters need be used by the view portion of the pipeline, even if those model parameters were essential in the analytics portion. Also, the model parameter 1811D is shown bound to two different input parameters of view components representing that the model parameters may be bound to multiple view component parameters. In one embodiment, The definition of the bindings between the model parameters and the view component parameters may be formulated by 1) being explicitly set by the author at authoring time, 2) explicit set by the user at use time (subject to any restrictions imposed by the author), 3) automatic binding by the authoring component 1640 based on algorithmic heuristics, and/or 4) prompting by the authoring component of the author and/or user to specify a binding when it is determined that a binding cannot be made algorithmically.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage devices having thereon computer-executable instructions that are structured such that, when executed by one or more processors of a computing system, cause the computing system to perform a method for facilitating binding of a data source to a compound control, the method comprising:
    identifying a plurality of properties of the compound control;
    identifying a name and a type for each of the plurality of properties of the compound control;
    comparing compound control information and data source information from one or more possible data sources to determine if the one or more possible data sources can be used as a source of data to bind to the compound control;
    identifying a particular data source to bind to the compound control, the particular data source having a plurality of fields organized within a schema and each field of the particular data source having a type, the particular data source having been identified as having, for each of the plurality of properties of the compound control, at least one field of the plurality of fields having a type corresponding to each of the identified types of the each of the plurality of properties of the compound control;
    heuristically identifying a set of one or more fields of the particular data source that can be bound to a corresponding property of the compound control, the set of one or more fields identified using at least the schema of the data source, metadata regarding the corresponding property, the identified name and type of each of the plurality of properties of the compound control, and names and the types of the plurality of fields of the particular data source; and
    binding at least one of the identified one or more fields of the particular data source that can be bound to a corresponding property of the compound control to the corresponding property of the compound control.

2. The computer program product in accordance with claim 1, wherein the corresponding property of the compound control has bound thereto an output parameter of a transformation, wherein the set of one or more fields of the particular data source may be bound to the corresponding property of the compound control through the transformation by being bound to one or more input parameters of the transformation.

3. The computer program product in accordance with claim 2, wherein the compound control is included within a recalculation user interface, and is bound to input parameters to and output parameters from a transformation chain that includes the transformation.

4. The computer program product in accordance with claim 3, wherein the transformation is declarative.

5. The computer program product in accordance with claim 4, wherein the computer executable instructions are further structured such that, when executed by the one or more processors, the computing system responds to editing of the declarative transformation by performing the following:
    an act of using at least the schema of the data source and metadata regarding the corresponding property to identify a set of one or more other fields of the particular data source that may be bound to the corresponding property of the compound control.

6. The computer program product in accordance with claim 5, wherein the computer executable instructions are further structured such that, when executed by the one or more processors, the computing system further responds to editing of the declarative transformation by performing the following:
    an act of default binding one of the set of one or more other identified fields of the particular data source to the corresponding property of the compound control.

7. The computer program product in accordance with claim 2, wherein the set of one or more fields of the particular data source are identified also using the transformation associated with the corresponding property of the compound control.

8. The computer program product in accordance with claim 1, the method further comprising:
    an act of default binding one of the set of one or more identified fields of the particular data source to the corresponding property of the compound control.

9. The computer program product in accordance with claim 8, wherein the computer executable instructions are further structured such that, when executed by the one or more processors, the computing system responds to user input by further performing the following:
    an act of determining that the user input is indicative of an intent to change the binding to the corresponding property of the compound control; and
    in response to the act of determining, an act of binding another of the set of one or more identified fields of the particular data source to the corresponding property of the compound control.

10. The computer program product in accordance with claim 1, wherein identifying the particular data source to bind to the compound control comprises:
    an act of using metadata associated with the plurality of properties of the compound control and at least the schema of the particular data source to determine that the particular data source may be used as a source of data to bind to the compound control.

11. The computer program product in accordance with claim 1, wherein identifying the particular data source to bind to the compound control comprises:
   accessing at least a schema for each of a plurality of data sources;
   for each of the plurality of data sources, comparing the at least the schema of the data source against the metadata associated with the plurality of properties of the compound control to determine whether the corresponding data source may be used as a source of data to bind to the compound control, and if the data source can be used as a source of data to bind to the compound control, an act of adding the corresponding data source to a list of available data sources,
   wherein after comparing is performed for all of the plurality of data sources, the list includes multiple data sources including the particular data source; and
   receiving a user selection of the particular data source.

12. The computer program product in accordance with claim 1, wherein heuristically identifying is performed for at least some of the plurality of properties of the compound control.

13. The computer program product in accordance with claim 1, wherein heuristically identifying is performed for all of the plurality of properties of the compound control.

14. The computer program product in accordance with claim 1, wherein for at least a second of the plurality of properties of the compound control, the method further comprises:
   an act of providing a transformation authoring interface that is specific to a type of the property.

15. The computer program product in accordance with claim 1, wherein the compound control is included within a recalculation user interface.

16. The computer program product in accordance with claim 15, wherein the recalculation user interface is a spreadsheet document.

17. The computer program product in accordance with claim 1, wherein the computer executable instructions are further structured such that, when executed by the one or more processors, the computing system responds to add addition of a control to the component control by performing the following:
   identifying at least one property of the added control;
   using at least the schema of the data source and metadata regarding the at least one property of the added control to identify a set of one or more fields of the particular data source that may be bound to the at least one property of the added control; and
   default binding one of the set of one or more identified fields of the particular data source to the at least one property of the added control.

18. The computer program product in accordance with claim 1, wherein the metadata regarding the corresponding property comprises at least two of a type, a name, a hint, and a previous usage of the corresponding property.

19. A method for facilitating binding of a data source to a compound control, the method performed by executing instructions within a computing system, the method comprising:
   identifying a plurality of properties of the compound control;
   identifying a name and a type for each of the plurality of properties of the compound control;
   comparing compound control information and data source information from one or more possible data sources to determine if the one or more possible data sources can be used as a source of data to bind to the compound control;
   identifying a particular data source to bind to the compound control, the particular data source having a plurality of fields organized within a schema and each field of the particular data source having a type, the particular data source having been identified as having, for each of the plurality of properties of the compound control, at least one field of the plurality of fields having a type corresponding to each of the identified types of the each of the plurality of properties of the compound control;
   heuristically identifying a set of one or more fields of the particular data source that can be bound to a corresponding property of the compound control, the set of one or more fields identified using at least the schema of the data source, metadata regarding the corresponding property, the identified name and type of each of the plurality of properties of the compound control, and names and the types of the plurality of fields of the particular data source; and
   binding at least one of the identified one or more fields of the particular data source that can be bound to a corresponding property of the compound control to the corresponding property of the compound control.

20. A computer program product comprising one or more computer-readable storage devices having thereon computer-executable instructions that are structured such that, when executed by one or more processors of a computing system, cause the computing system to perform a method for facilitating binding of a data source to a compound control, the method comprising:
   identifying a plurality of properties of the compound control used in a recalculation user interface;
   identifying a name and a type for each of the plurality of properties;
   comparing compound control information and data source information from one or more possible data sources to determine if the one or more possible data sources can be used as a source of data to bind to the compound control;
   identifying a particular data source to bind to the compound control, the particular data source having a plurality of fields organized within a schema and each field of the particular data source having a type, the particular data source having been identified as having, for each of the plurality of properties of the compound control, at least one field of the plurality of fields having a type corresponding to each of the identified types of the each of the plurality of properties of the compound control;
   heuristically identifying a set of one or more fields of the particular data source that can be bound to a corresponding property of the compound control, the set of one or more fields identified using at least the schema of the data source, metadata regarding the corresponding property, the identified name and type of each of the plurality of properties of the compound control, and names and the types of the plurality of fields of the particular data source,
      wherein the corresponding property of the compound control has bound thereto an output parameter of a declarative transformation,
      wherein the set of one or more fields of the particular data source may be bound to the corresponding property of the compound control through the declarative transformation by being bound to one or more input parameters of the transformation,
wherein the set of one or more fields of the particular data source are identified also using the transformation associated with the corresponding property of the compound control;
binding at least one of the identified one or more fields of the particular data source that can be bound to a corresponding property of the compound control to the corresponding property of the compound control, including default binding one of the set of one or more identified fields of the particular data source to the corresponding property of the compound control;
determining that user input is indicative of an intent to change the binding to the corresponding property of the compound control; and
in response to determining, binding another of the set of one or more identified fields of the particular data source to the corresponding property of the compound control.

21. A system for facilitating binding of a data source to a compound control, the system comprising:
one or more computer processors; and
one or more computer-readable storage media having thereon computer-executable instructions which, when executed by the one or more processors of the system, enable the system to:
identify a plurality of properties of the compound control;
identify a name and a type for each of the plurality of properties of the compound control;
comparing compound control information and data source information from one or more possible data sources to determine if the one or more possible data sources can be used as a source of data to bind to the compound control;
identify a particular data source to bind to the compound control, the particular data source having a plurality of fields organized within a schema and each field of the particular data source having a type, the particular data source having been identified as having, for each of the plurality of properties of the compound control, at least one field of the plurality of fields having a type corresponding to each of the identified types of the each of the plurality of properties of the compound control;
heuristically identify a set of one or more fields of the particular data source that may be bound to a corresponding property of the compound control, the set of one or more fields identified using at least the schema of the data source, metadata regarding the corresponding property, the identified name and type of each of the plurality of properties of the compound control, and names and the types of the plurality of fields of the particular data source; and
binding at least one of the identified one or more fields of the particular data source that can be bound to a corresponding property of the compound control to the corresponding property of the compound control.

22. The system of claim 21, wherein the corresponding property of the compound control has bound thereto an output parameter of a transformation, wherein the set of one or more fields of the particular data source may be bound to the corresponding property of the compound control through the transformation by being bound to one or more input parameters of the transformation.

23. The system of claim 22, wherein the compound control is included within a recalculation user interface and is bound to input parameters to and output parameters from a transformation chain that includes the transformation.

24. The system of claim 23, wherein the transformation is declarative.

25. The system of claim 24, wherein the computer executable instructions are further structured such that, when executed by the one or more processors, further enable the system to respond to editing of the declarative transformation by
using at least the schema of the data source and metadata regarding the corresponding property to identify a set of one or more other fields of the particular data source that may be bound to the corresponding property of the compound control.

26. The system of claim 25, wherein the computer executable instructions are further structured such that, when executed by the one or more processors, further enable the system to respond to editing of the declarative transformation by
default binding one of the set of one or more other identified fields of the particular data source to the corresponding property of the compound control.

* * * * *